(12) United States Patent
Tashiro et al.

(10) Patent No.: US 7,847,522 B2
(45) Date of Patent: Dec. 7, 2010

(54) BATTERY DEVICE

(75) Inventors: Kei Tashiro, Kanagawa (JP); Yoichi Miyajima, Tokyo (JP); Osamu Nagashima, Tokyo (JP); Toshio Takeshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 705 days.

(21) Appl. No.: 11/782,272

(22) Filed: Jul. 24, 2007

(65) Prior Publication Data

US 2008/0036425 A1 Feb. 14, 2008

(30) Foreign Application Priority Data

Aug. 10, 2006 (JP) ............... 2006-218285

(51) Int. Cl.
*H02J 7/04* (2006.01)
*H01M 2/00* (2006.01)
*H01M 10/50* (2006.01)

(52) U.S. Cl. ............... 320/154; 249/61; 249/62
(58) Field of Classification Search .......... 320/154
See application file for complete search history.

(56) References Cited

U.S. PATENT DOCUMENTS 5,633,574 A * 5/1997 Sage ............... 320/107
6,649,302 B2 * 11/2003 Shimada et al. ........... 429/62
2003/0107347 A1 * 6/2003 Yoshizawa et al. ......... 320/150

FOREIGN PATENT DOCUMENTS

| JP | 10-284133 | 10/1998 |
|---|---|---|
| JP | 2000-30719 | 1/2000 |
| JP | 2006-196296 | 7/2006 |

* cited by examiner

*Primary Examiner*—Edward Tso
*Assistant Examiner*—Yalkew Fantu
(74) *Attorney, Agent, or Firm*—Oblon, Spivak, McClelland, Maier & Neustadt, L.L.P.

(57) ABSTRACT

A battery device includes a battery cell constituted by a secondary cell, a case that houses the battery cell, and a battery-side positive electrode terminal and a battery-side negative electrode terminal electrically provided in the case and connected to the battery cell. The battery device further includes a temperature detecting unit that detects the temperature of the battery cell, a temperature control unit that heats and/or cools the battery cell when an electric current is supplied thereto, and a current control unit that divides, according to the temperature detected by the temperature detecting unit, an externally-supplied charging current supplied from the outside via the battery-side positive electrode terminal and the battery-side negative electrode terminal into a first current supplied to the battery cell and a second current supplied to the temperature control unit.

19 Claims, 18 Drawing Sheets

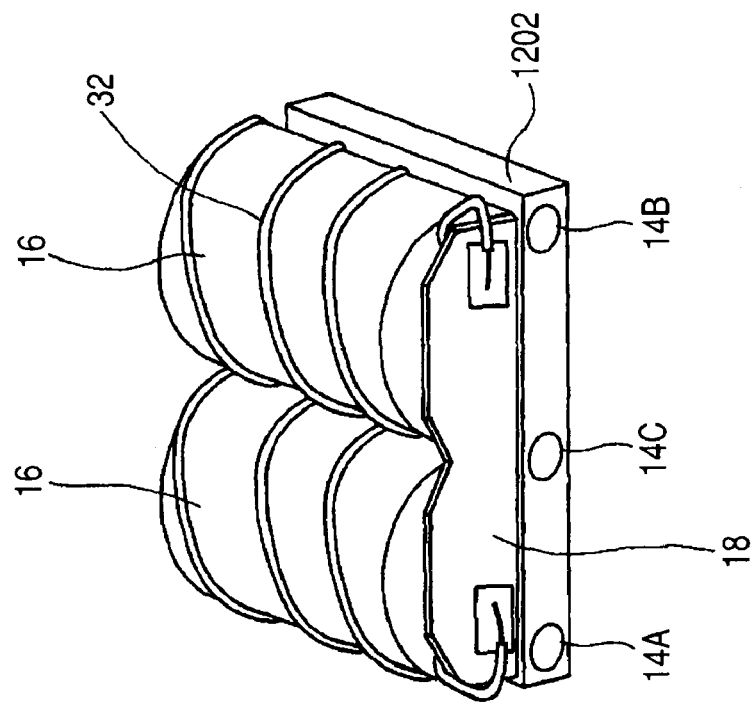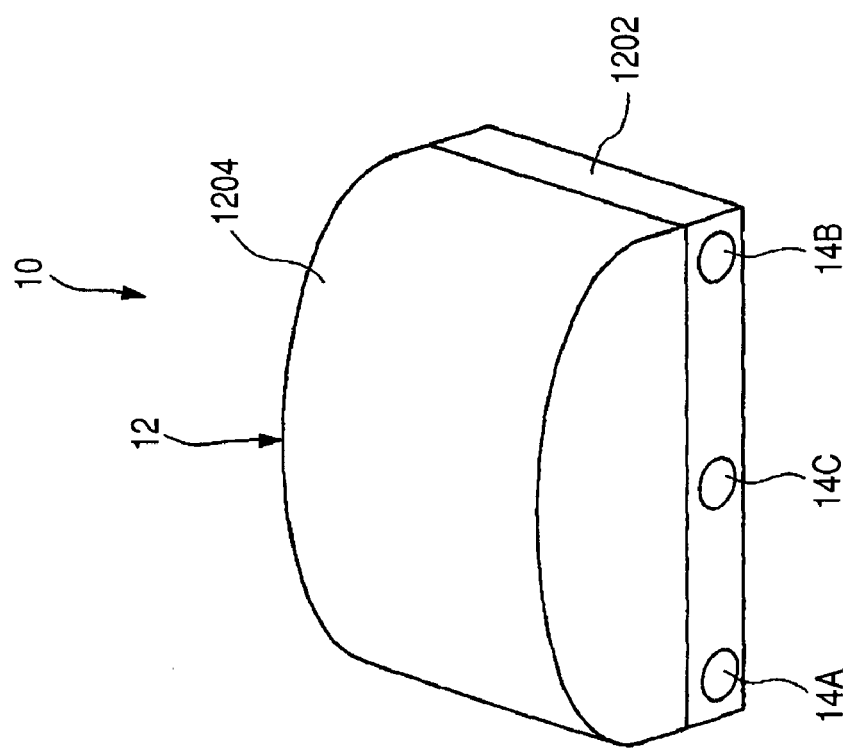

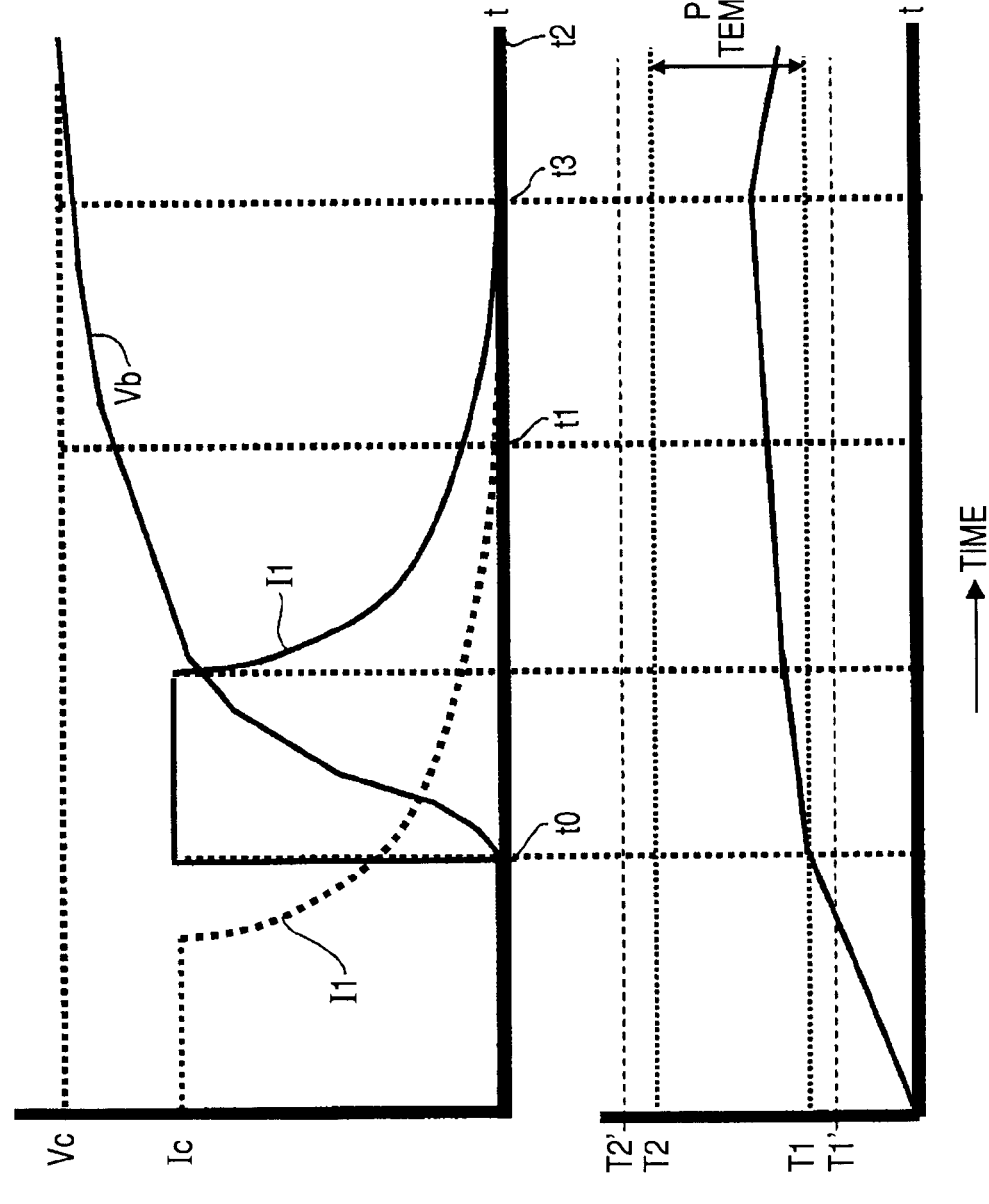

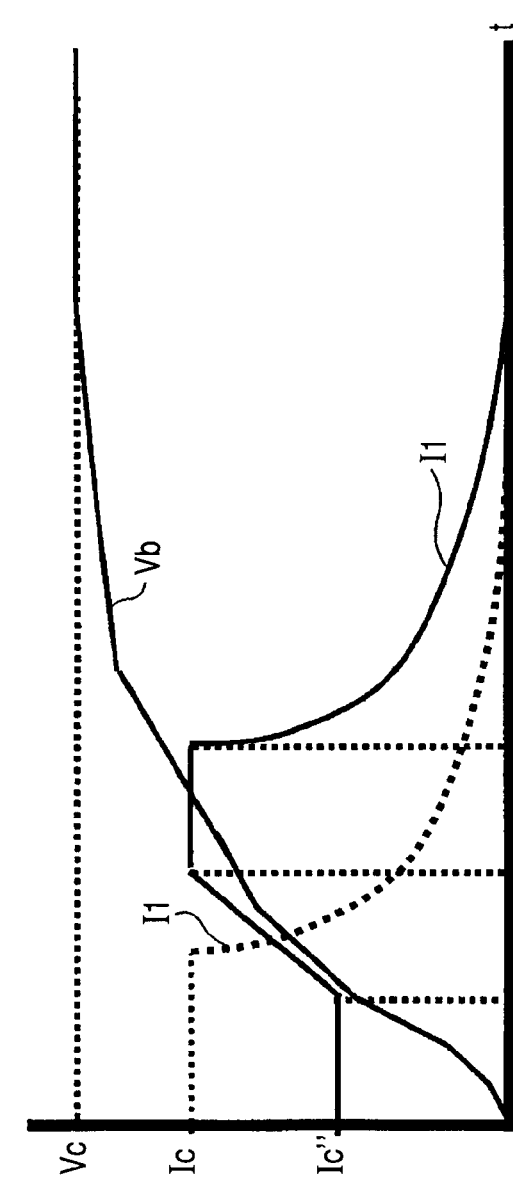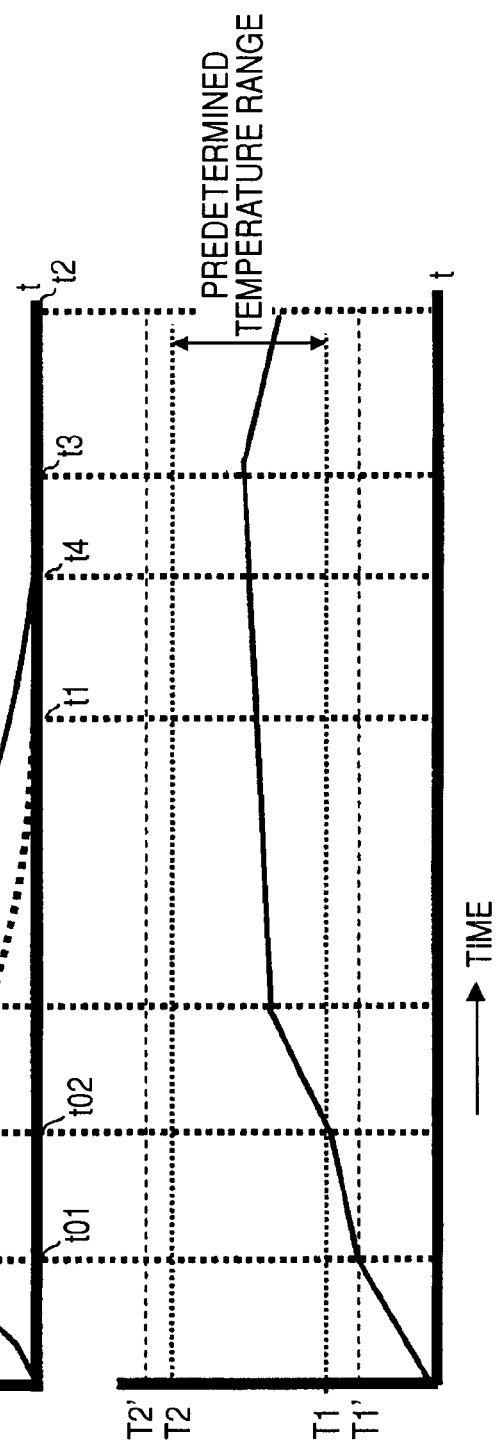
FIG. 6A
FIG. 6B

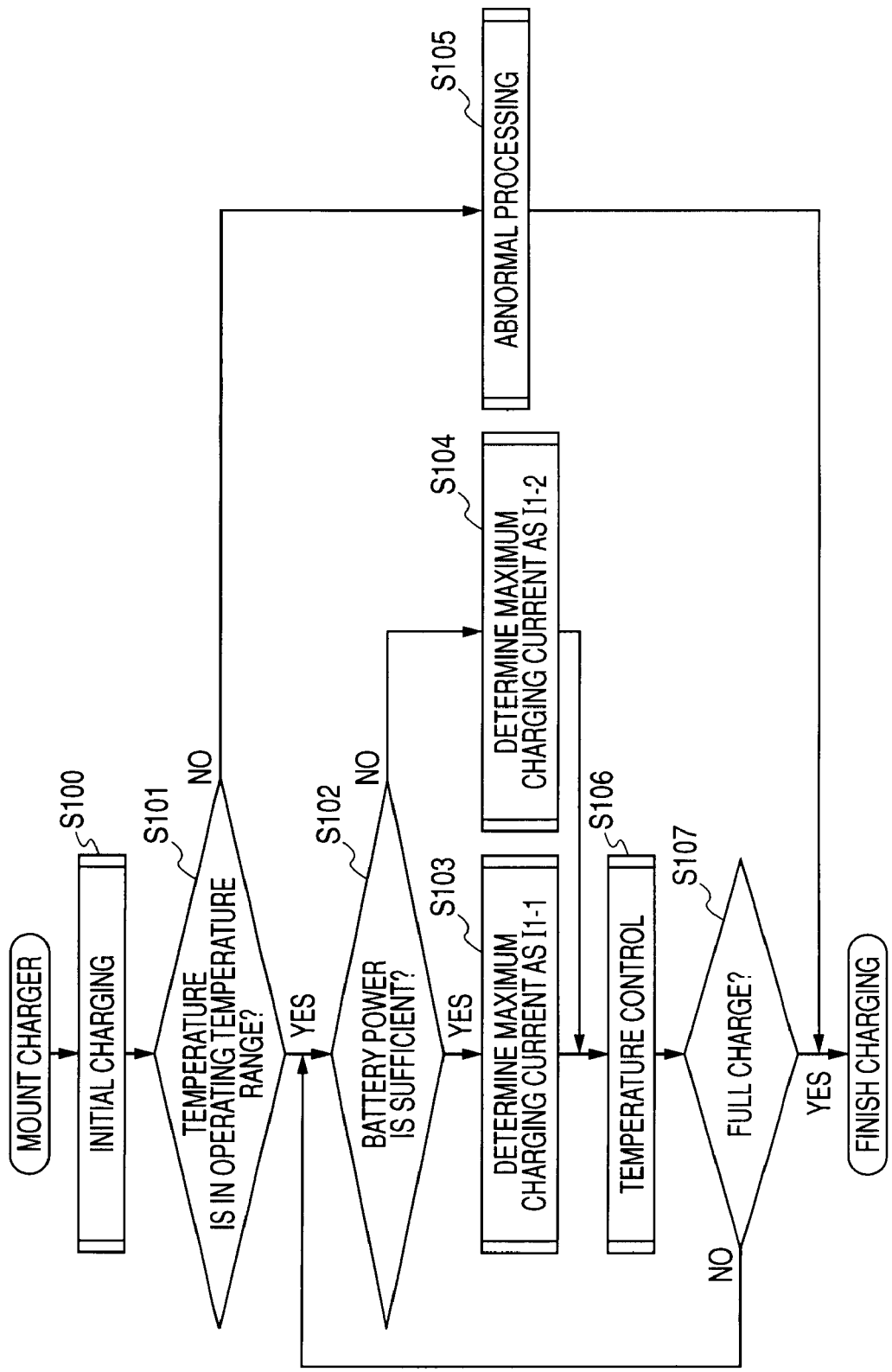

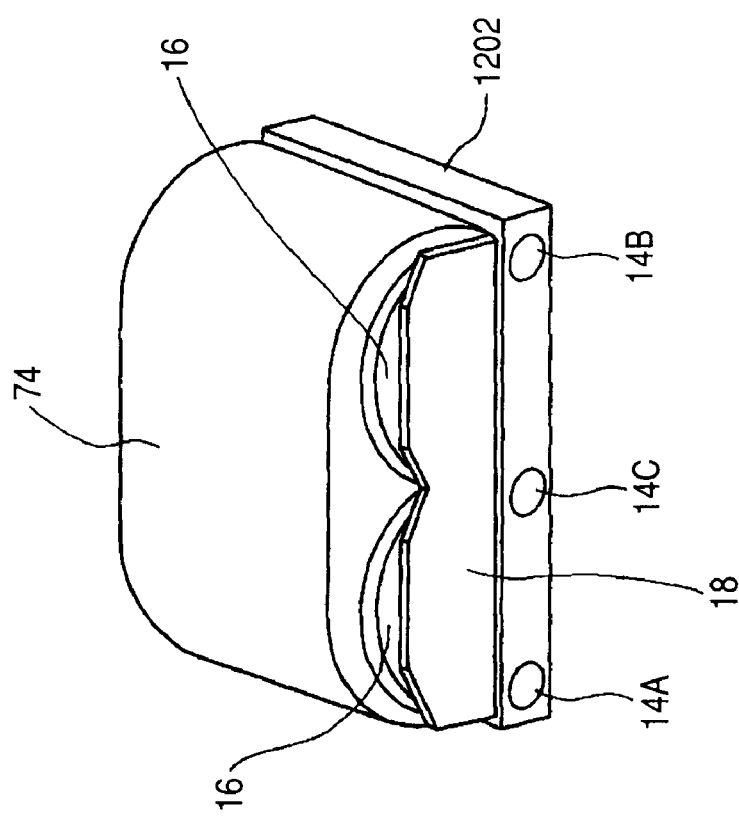
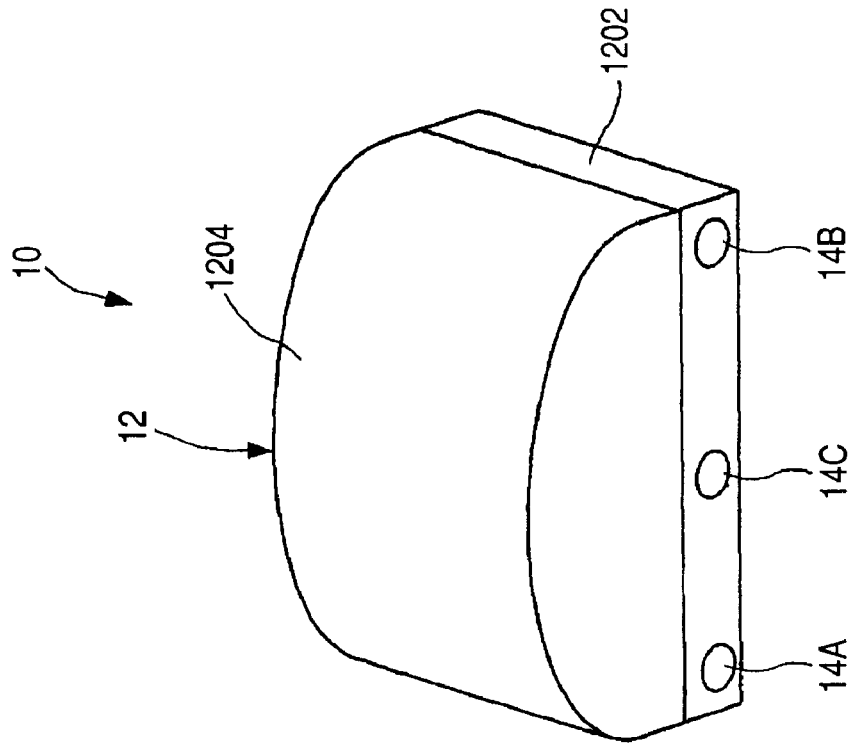

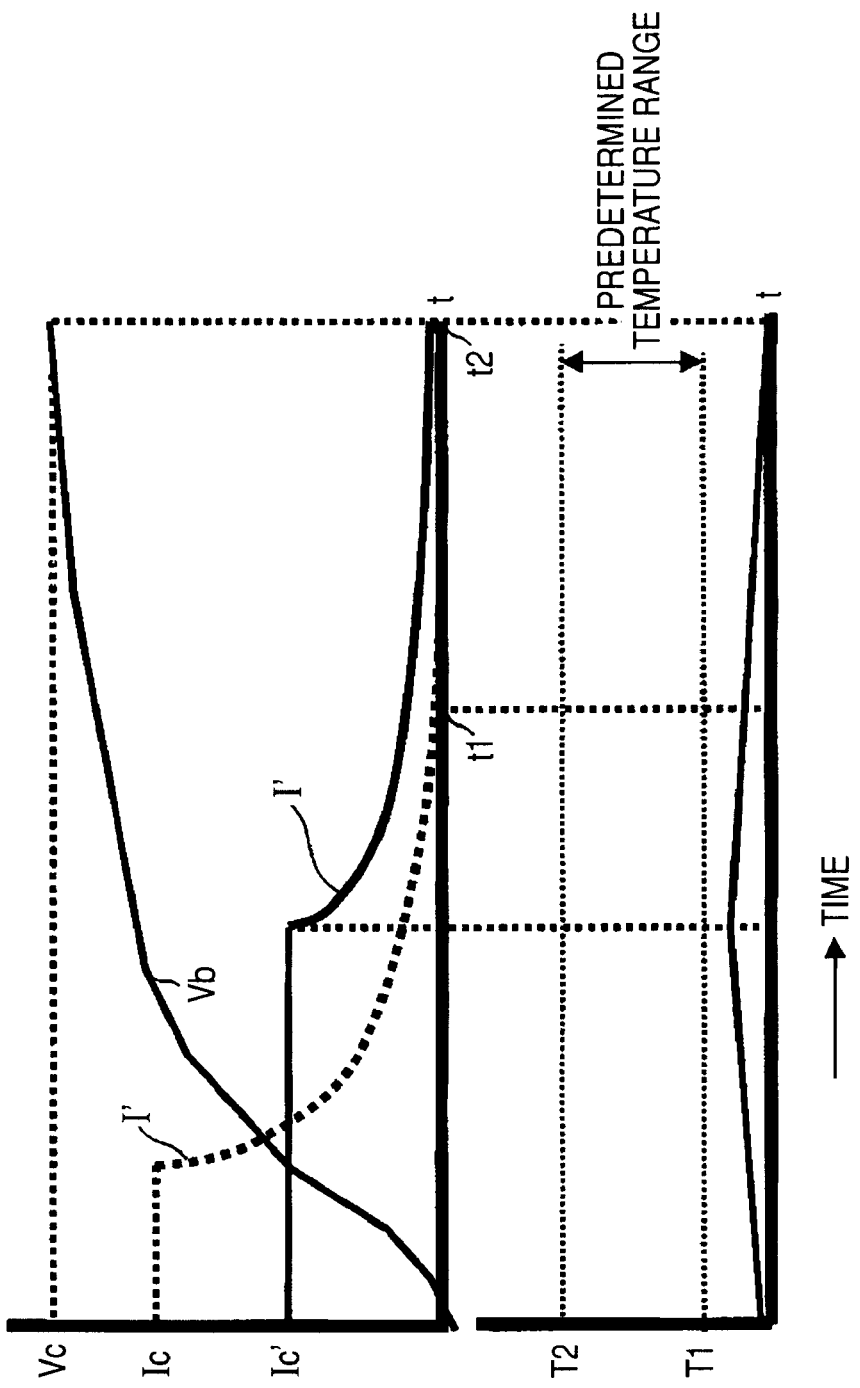

BATTERY DEVICE

CROSS REFERENCES TO RELATED APPLICATIONS

The present invention contains subject matter related to Japanese Patent Application JP 2006-218285 filed in the Japanese Patent Office on Aug. 10, 2006, the entire contents of which being incorporated herein by reference.

BACKGROUND OF THE INVENTION

1. Field of the Invention

The present invention relates to a battery device.

2. Description of the Related Art

There is a battery device (a battery pack) that has a battery cell (a rechargeable battery) constituted by a secondary cell.

When the battery cell is discharged at temperature higher or lower than a predetermined temperature range, deterioration in the battery cell is quickened to reduce durable life of the battery cell.

Thus, in many cases, a temperature detecting unit such as a thermistor and a control circuit that interrupts an output current outputted from an electrode terminal of the battery device according to temperature detected by the temperature detecting unit are built in the battery device. This prevents the discharge at the temperature higher or lower than the predetermined temperature range and prevents the deterioration in the battery cell.

It is also proposed to provide, in an electronic apparatus in which such a battery device is used, heat generating means for generating heat with an electric current supplied from a battery device to heat the battery device with the heat generating means during use at a low temperature (see JP-A-2000-30719).

SUMMARY OF THE INVENTION

On the other hand, when such a battery device is charged under an environment of a low temperature equal to or lower than, for example, 0 degree, because of a general characteristic of a battery cell, deterioration in the battery cell is quickened. Thus, a charging current that can be supplied to the battery cell has to be set to an electric current small enough for not causing the deterioration in the battery cell.

When the battery device is charged under an environment of a high temperature equal to or higher than, for example, 45 degrees, because of the general characteristic of the battery cell, deterioration in the battery cell is quickened as in the charging under the low-temperature environment. Thus, as in the case of the charging under the low-temperature environment, a charging current supplied to the battery cell has to be set to a predetermined charging current small enough for not causing the deterioration in the battery cell.

Therefore, at the time of a low temperature and a high temperature, it takes long to charge the battery device. Since the charging condition is not optimum, it is difficult to charge the battery cell to full power thereof.

Since these operations are performed on a charger side and a charging amount is controlled by a circuit in the charger, a structure of the charger is complicated. Moreover, strictly speaking, optimum conditions of a deteriorated battery and a new battery are different. Thus, it is difficult to adjust an optimum condition for every battery on the charger side.

Therefore, it is desirable to provide a battery device that is advantageous in charging a battery cell to sufficient power thereof while reducing a charging time by adjusting a charging current according to the temperature of the battery cell in the battery device and adjusting the temperature to temperature optimum for charging.

According to an embodiment of the present invention, there is provided a battery device including a battery cell constituted by a secondary cell, a case that houses the battery cell, and a battery-side positive electrode terminal and a battery-side negative electrode terminal electrically provided in the case and connected to the battery cell. The battery device includes a temperature detecting unit that detects the temperature of the battery cell, a temperature control unit that heats and/or cools the battery cell when an electric current is supplied thereto, and a current control unit that divides, according to the temperature detected by the temperature detecting unit, an externally-supplied charging current supplied from the outside via the battery-side positive electrode terminal and the battery-side negative electrode terminal into a first current supplied to the battery cell and a second current supplied to the temperature control unit.

With the battery device according to the embodiment of the present invention, when it is detected that the temperature of the battery cell deviates from a predetermined temperature range suitable for charging, since the second current split from the externally-supplied charging current is supplied to the temperature control unit, it is possible to adjust the temperature of the battery cell to be within the predetermined temperature range. Consequently, it is possible to supply a charging current of a sufficient magnitude to the battery cell. This is advantageous in charging the battery cell to sufficient power thereof while reducing a charging time.

BRIEF DESCRIPTION OF THE DRAWINGS

FIG. 1A is a perspective view of a battery device 10;

FIG. 1B is a perspective view of the battery device 10 from which an upper case 1204 is removed;

FIG. 5A is a graph showing changes in the charging current (the first current I1) supplied to the battery cells 16 and the battery cell voltage Vb during charging at a low temperature;

FIG. 5B is a graph showing a temperature change of the battery cells 16 during charging at the low temperature;

FIG. 6A is a graph showing a change in the charging current (the first current I1) supplied to the battery cells 16 and the battery cell voltage Vb during charging at a low temperature;

FIG. 6B is a graph showing a temperature change of the battery cell during charging at the low temperature;

FIG. 7 is a flowchart for explaining an overall charging operation;

FIG. 9A is a perspective view of the battery device 10 according to a second embodiment of the present invention;

FIG. 9B is a perspective view of the battery device 10 from which the upper case 1204 is removed;

FIG. 18A is a graph showing changes in the charging current (the first current I1) supplied to the battery cells 16 and the battery cell voltage Vb during charging at a low temperature; and FIG. 18B is a graph showing a temperature change of the battery cells 16 during charging at the low temperature.

DESCRIPTION OF THE PREFERRED EMBODIMENTS

Embodiments of the present invention will be hereinafter explained with reference to the accompanying drawings.

First Embodiment

Figure 2:
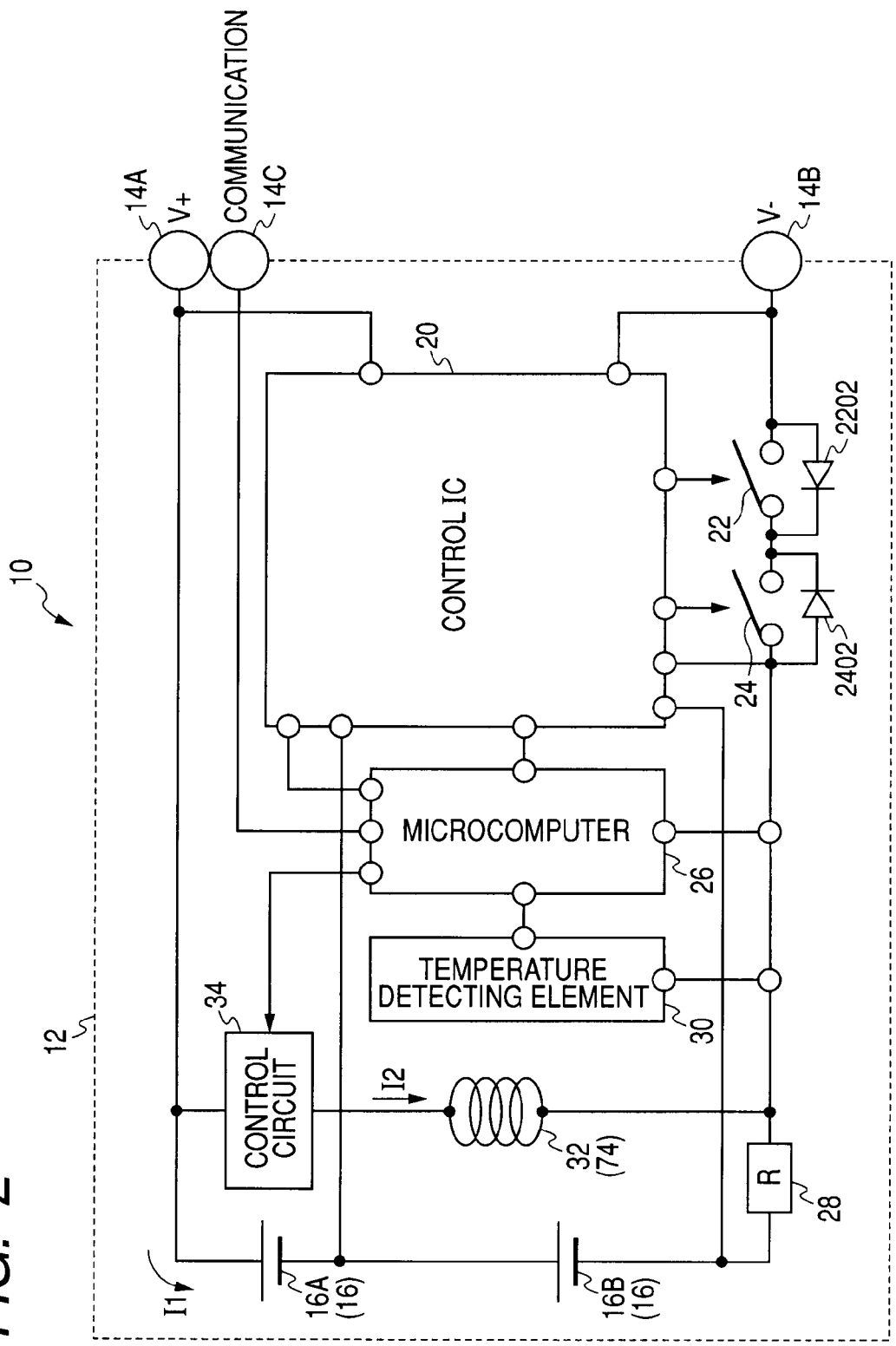
FIG. 2 is a block diagram showing a structure of the battery device 10.
Figure 3:
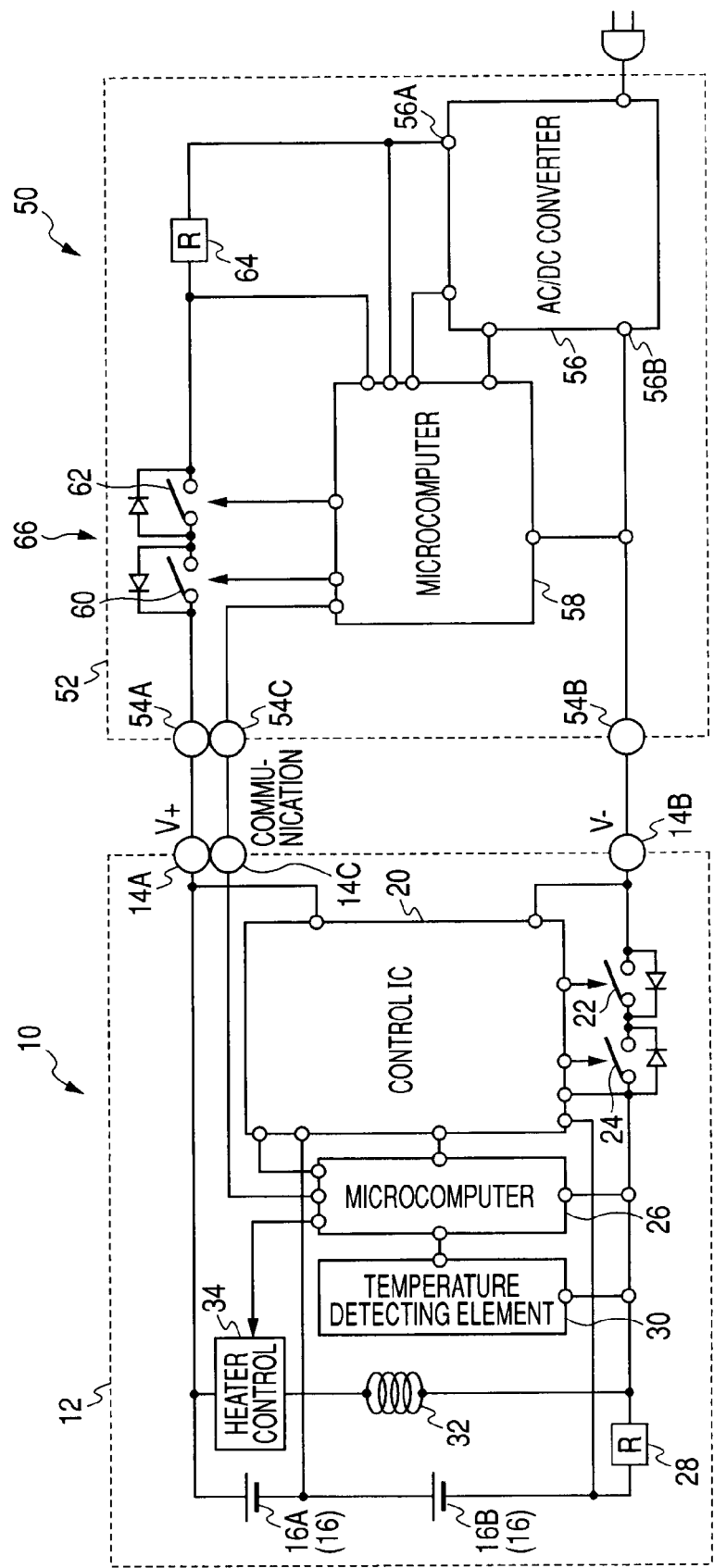
FIG. 3 is a block diagram showing a state in which the battery device 10 is mounted on a charger 50 and charged.

A battery device 10 according to a first embodiment of the present invention will be explained. FIG. 1A is a perspective view of the battery device 10 and FIG. 1B is a perspective view of the battery device 10 from which an upper case 1204 is removed. FIG. 2 is a block diagram showing a structure of the battery device 10. FIG. 3 is a block diagram showing a state in which the battery device 10 is mounted on the charger 50 and charged.

As shown in FIG. 1A, the battery device 10 has a case 12. The case 12 is constituted by connecting a lower case 1202 assuming a rectangular tabular shape and an upper case 1204 having four sides connected to four edges of the lower caser 1202 and an upper surface that connect upper portions of the four sides.

On one side of the lower case 1202, a battery-side positive electrode terminal 14A, a battery-side negative electrode terminal 14B, and a battery-side communication terminal 14C connected to a positive electrode terminal, a negative electrode terminal, and a communication terminal of an electronic apparatus, or, as shown in FIG. 3, connected to a charger-side positive electrode terminal 54A, a charger-side negative electrode terminal 54B, and a charger-side communication terminal 54C of the charger 50, respectively, are provided.

As shown in FIG. 1B, in this embodiment, the battery device 10 includes two battery cells (rechargeable batteries) 16 constituted by secondary cells and a control substrate 18. The battery cells 16 and the control substrate 18 are housed in a housing space formed between the lower case 1202 and the upper case 1204.

As the secondary cells constituting the battery cells 16, it is possible to adopt various publicly-known secondary batteries such as a lithium ion battery, a nickel hydrogen battery, and a nickel cadmium battery.

As shown in FIG. 2, in addition to the two battery cells 16, the battery device 10 includes a control IC 20, a charging control SW 22, a discharge control SW 24, a microcomputer 26, a current detection resistor 28, a temperature detecting element 30, a heater 32 (see FIG. 1B), and a control circuit 34.

The control IC 20, the charging control SW 22, the discharge control SW 24, the microcomputer 26, the current detection resistor 28, the temperature detecting element 30, and the control circuit 34 are mounted on the control substrate 18.

The two battery cells 16 are connected in series. A cell-side positive electrode terminal of one battery cell 16A is connected to the battery-side positive electrode terminal 14A, a cell-side negative electrode terminal of the battery cell 16A is connected to a cell-side positive electrode terminal of the other battery cell 16B, and a cell-side negative electrode terminal of the other battery cell 16B is connected to the battery-side negative electrode terminal 14B via the current detection resistor 28, the discharge control SW 24, and the charging control SW 22.

The current detection resistor 28 has a resistance of, for example, several tens mΩ. The current detection resistor 28 is used for detecting, in the control IC 20, a charging current and a discharge current of the battery cells 16 according to voltage drop of an electric current flowing through the current detection resistor 28.

The charging control SW 22 and the discharge control SW 24 are connected in series. On and off operations of the charging control SW 22 and the discharge control SW 24 are controlled by a control signal from the control IC 20.

A diode 2202 is connected to both ends of the charging control SW 22 and a diode 2402 is connected to both ends of the discharge control SW 24.

In general, transistors are used as the charging control SW 22 and the discharge control SW 22. In particular, FETs are used as the charging control SW 22 and the discharge control SW 24. Composite parts obtained by integrating the charging control SW 22 and the discharge control SW 24 with the diodes 2202 and 2402, respectively, are often used. Composite parts obtained by integrating SW 60 and SW 62 and two diodes may be used.

The temperature detecting element 30 detects the temperature of the battery cells 16. The temperature detecting element 30 is constituted by, for example, a thermistor, a resistance of which changes according to a temperature change. In order to accurately detect the temperature of the battery cells 16, it is preferable to provide the temperature detecting element 30 close to or in contact with the battery cells 16. In this embodiment, one end of the temperature detecting element 30 is connected to the microcomputer 26 and the other end is connected to a negative electrode (GND) of the battery cell 16B via the current detection resistor 28. As the temperature detecting element 30, it is possible to use various publicly-known elements that have been provided in battery devices for the purpose of interrupting a charging current or a discharge current in order to prevent deterioration in battery cells 16 at a low temperature or at a high temperature.

The heater 32 is a heat generating element that heats the battery cells 16 when an electric current is supplied thereto. In this embodiment, a temperature control unit includes the heater 32.

In this embodiment, as shown in FIG. 1B, the heater 32 assumes a linear shape having flexibility and arranged to be wound around an outer periphery of the two battery cells 16. In this embodiment, one end of the heater 32 is connected to the battery-side positive electrode element 14A via the control circuit 34 and the other end is connected to the negative electrode (GND) of the battery cell 16B via the current detection circuit 28. The temperature control unit is not limited to the structure including the heat generating element constituted by such a linear heater 32. It is possible to adopt structures including various publicly-known heat generating elements that generate heat with an electric current.

The control circuit 34 divides (splits) a charging current supplied from the outside via the battery-side positive electrode terminal 14A and the battery-side negative electrode terminal 14B (herein after referred to as externally-supplied charging current to distinguish the current from a charging current flowing to the battery cells 16) into a first current I1 supplied to the battery cells 16 and a second current I2 supplied to the heater 32 on the basis of a command from the microcomputer 26. In addition, the control circuit 34 includes a load resistance circuit for current consumption to adjust current amounts to the battery cells 16 and the heaters 32.

The control IC 20 has a function of preventing overcharging and overdischarge of the battery cells 16 to protect the battery cells 16. The control IC 20 is designed according to respective electric characteristics (specifications) of the battery cells 16.

The control IC 20 monitors a charging current and a discharge current to the battery device 10 (the battery cells 16) on the basis of voltage drop of the current detection resistor 28. During charging, the control IC 20 turns off the charging control SW 22 according to a value of the charging current to prevent overcharging to the battery cells 16. During discharge, the control IC 20 turns off the discharge control SW 24 according to a value of the discharge current to prevent overdischarge of the battery cells 16 or overcurrent such as short-circuit of the battery-side positive electrode terminal 14A and the battery-side negative electrode terminal 14B.

The microcomputer 26 includes a CPU, a memory, and a peripheral interface, which are not shown in the figure. The microcomputer 26 operates by executing a program stored in the memory.

The microcomputer 26 calculates a remaining battery power on the basis of the charging current and the discharge current detected by the control IC 20. In other words, the microcomputer 26 calculates a usable quantity of electricity and a charged quantity of electricity. In this embodiment, the microcomputer 26 integrates the charging current and the discharge current to detect the remaining battery power (a charged power).

The microcomputer 26 has a publicly-known function of turning off, when it is judged that the temperature of the battery cells 16 detected by the temperature detecting element 30 is an abnormal high temperature or an abnormal low temperature that hinders a normal charging operation and a normal discharge operation of the battery cells, the charging control SW 22 and the discharge control SW 24 via the control ID 20 to thereby forcibly stop a charging operation and a discharge operation to prevent deterioration in the battery cells 16.

The microcomputer 26 controls the control circuit 34 on the basis of the temperature of the battery cells 16 detected by the temperature detecting element 30 to adjust, according to the temperature detected, current values of the first and second currents I1 and I2 divided by the control circuit 34.

Therefore, in this embodiment, a current control unit as claimed in this application includes the control circuit 34 and the microcomputer 26.

The microcomputer performs data communication with an electronic apparatus on which the battery device 10 is mounted or the charger 50 (see FIG. 3) via the control IC 20 and the battery-side communication terminal 14.

In this data communication, "battery data", which is data indicating a state in the battery device 10, is transmitted to the electronic apparatus or the charger 50. Examples of the battery data include data of an electric current, a voltage, and the like charged (discharged) by the battery device 10, remaining power data indicating a battery remaining power of the battery cells 16, number-of-times-of-use data indicating the number of times of charging (the number of times of discharge) of the battery device 10, and battery identification data peculiarly allocated to the battery device 10 and used by the electronic apparatus or the charger 50 (see FIG. 3) to identify a type and a characteristic of the battery device 10.

The charger 50 that charges the battery device 10 will be explained with reference to FIG. 3.

The charger 50 has a case 52. A charger-side positive electrode terminal 54A, a charger-side negative electrode terminal 54B, and a charger-side communication terminal 54C connected to the battery-side positive electrode terminal 14A, the battery-side negative electrode terminal 14B, and the battery-side communication terminal 14C of the battery device 10, respectively, are provided in the case 52.

The charger 50 includes an AC/DC converter 56, a microcomputer 58, charging control SWs 60 and 62, and a current detection resistor 64.

The AC/DC converter 56 generates a DC voltage from a commercial AC power supply. The AC/DC converter 56 has a positive electrode output terminal 56A and a negative electrode output terminal 56B.

The positive electrode output terminal 56A is connected to the charger-side positive electrode terminal 54A via charging control FETs 60 and 62 and a current detection resistor 64.

The negative electrode output terminal 56B is connected to the charger-side negative electrode 54B.

The current detection resistor 64 has a resistance of, for example, several tens mΩ. The current detection resistor 64 is used for detecting, in the microcomputer 58, an externally-supplied charging current supplied from the charger 50 to the battery device 10 according to voltage drop of an electric current flowing through the current detection resistor 64.

The charging control SWs 60 and 62 are connected in series. Diodes are connected to the SWs 60 and 62 to constitute a switch circuit 66. On and off operations of the switch circuit 66 are controlled by a control signal from the microcomputer 58.

In general, transistors are used as the SWs 60 and 62. In particular, FETs are used as the SWs 60 and 62. Composite parts obtained by integrating the SWs 60 and 62 with the diodes, respectively, are often used. Composite parts obtained by integrating SWs 60 and 62 and two diodes may be used.

The microcomputer 58 monitors an externally-supplied charging current to the battery device 10 on the basis of voltage drop of the current detection resistor 64. When the externally-supplied charging current falls below a predetermined value, the microcomputer 58 judges that charging of the battery device 10 has finished and turns off the switch circuit 66 to finish a charging operation for the battery cells 16. When an excessive externally-supplied charging current flows to the battery device 10, the microcomputer 58 judges that abnormality of the charging operation has occurred and turns off the switch circuit 66 to stop the charging operation for the battery cells 16.

The microcomputer 58 performs communication with the microcomputer 26 of the battery device 10 through the battery-side communication terminal 14C. The microcomputer 58 also monitors a charging current according to charging current data obtained by this communication. When a value of the charging current data falls below a predetermined value, the microcomputer 58 judges that charging of the battery device 10 has finished and turns off the switch circuit 66 to finish a charging operation for the battery cells 16. When it is detected by the communication with the microcomputer 26 of the battery device 10 through the battery-side communication terminal 14C that a value of the charging current data is excessively large, the microcomputer 58 judges that abnormality of the charging operation has occurred and turns off the switch circuit 66 to stop the charging operation for the battery cells 16.

The charging operation for the battery device 10 will be explained.

First, a charging operation at the normal temperature, i.e., a charging operation under a temperature environment suitable in charging the battery device 10 will be explained.

Figures 4A, 4B:
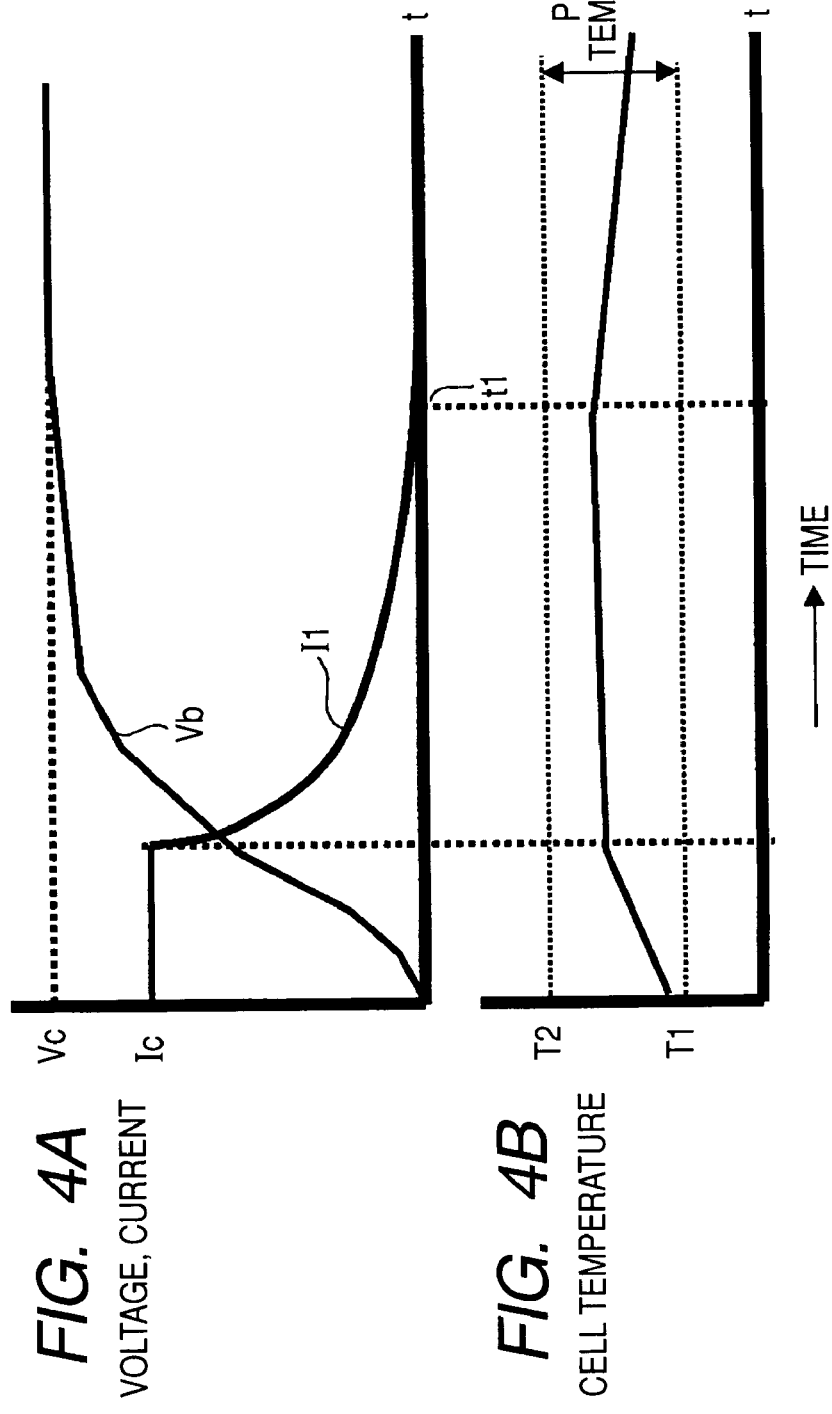
FIG. 4A is a graph showing changes in a charging current (a first current I1) supplied to battery cells 16 and a voltage Vb between a positive electrode terminal and a negative electrode terminal of the battery cell (hereinafter referred to as battery cell voltage Vb) during charging at the room temperature.
FIG. 4B is a graph showing a temperature change of the battery cells 16 during charging at the room temperature.

FIG. 4A is a graph showing a relation between (changes in) a charging current supplied (the first current I1) and a voltage Vb between a positive electrode terminal and a negative electrode terminal of the battery cells 16 (hereinafter referred to as battery cell voltage Vb) during charging under an optimum condition. FIG. 4B is a graph showing a temperature change of the battery cells 16 at that time.

In FIG. 4 and the subsequent figures, Vc indicates a battery cell voltage (a full-charge battery cell voltage) and Ic indicates a standard charging current at the room temperature, i.e., a maximum charging current that can be supplied to the battery cells 16.

In FIG. 4 and the subsequent figures, T1 and T2 indicate a lower limit value and an upper limit value of a predetermined temperature range suitable for charging the battery device 10, respectively.

As shown in FIG. 4B, temperature T of the battery cells 16 detected by the temperature detecting element 30 is in the predetermined range equal to or higher than T1 and equal to or lower than T2. In this state, when the battery device 10 is mounted on the charger 50, the microcomputer 26 controls the control circuit 34 to supply a charging current corresponding to the state of the battery cells 16 to the battery cells 16. If the battery cells 16 are in a normal state without abnormal overdischarge, deterioration, and the like, as shown in FIG. 4A, the microcomputer 26 causes the charger 50 to supply 100% of the externally-supplied charging current (the standard current Ic), which is supplied from the charger 50 to the battery device 10, to the battery cells 16 as the first current I1 and does not cause the charger 50 to supply the second current I2 to the heater 32.

Therefore, the externally-supplied charging current supplied from the charger 50 to the battery device 10 is directly supplied to the battery cells 16 and the battery cells 16 are charged.

As the power charged in the battery cells 16 increases, the battery cell voltage Vb rises and the first current I1 gradually falls. When the first current I1 reaches a current value corresponding to a full charge at time t1, the charger 50 stops the charging operation. In this case, the battery cell voltage Vb has reached the full-charge battery cell voltage Vc.

As shown in FIG. 4B, in a process of charging, the temperature of the battery cells 16 gradually rises according to the supply of a charging current. However, when the externally-supplied charging current stops at time t1, the temperature gradually falls.

In the charging operation at the room temperature, while the charging current is supplied to the battery cells 16, the temperature of the battery cells 16 is within the predetermined temperature range.

Here, for simplification of explanation, it is assumed that the first current I1 is set to 100% of the externally-supplied charging current (the standard current Ic). However, actually, power (remaining power) and a deterioration state (the number of times of use, etc.) of the battery cells 16 at that point are measured (monitored) by the microcomputer 26. According to a result of the measurement, the first current I1 is adjusted to a current value equal to 100% of the externally-supplied charging current (the standard current Ic) or a current value smaller than 100% and supplied. As a circuit that performs such adjustment of the charging current, it is possible to adopt publicly-known various circuits.

A first operation example of a charging operation at temperature lower than the predetermined temperature range will be explained.

Figure 8:
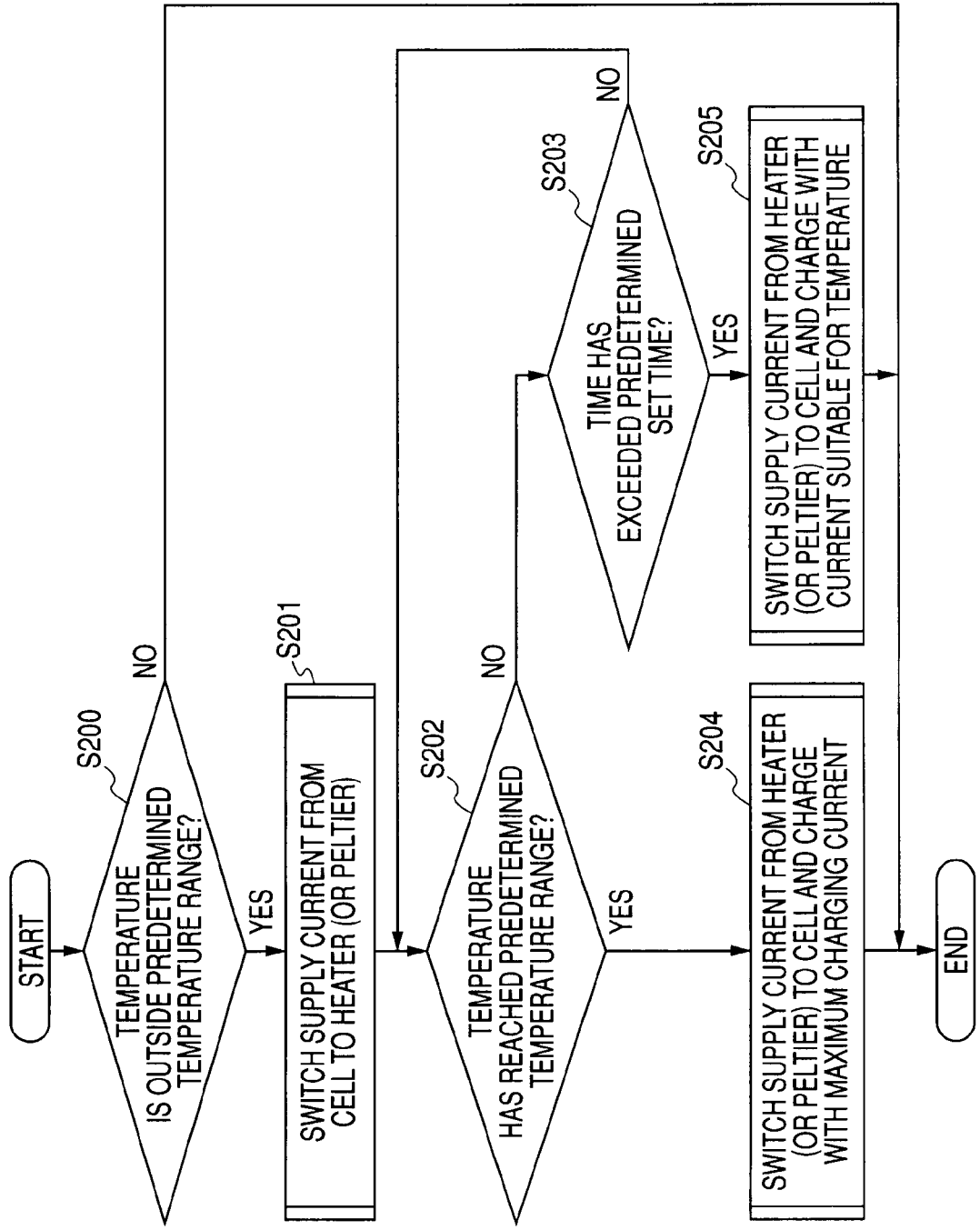
FIG. 8 is a flowchart corresponding to a first operation example.

In this first operation example, the battery cells 16 are heated to the predetermined temperature range using the heater 32 and, after the temperature of the battery cells 16 reaches the predetermined temperature range, the heating by the heater 32 is stopped and the battery cells 16 are charged with the standard charging current (see FIGS. 7 and 8).

FIG. 5A is a graph showing changes in the charging current (the first current I1) supplied to the battery cells 16 and the battery cell voltage Vb during charging at a low temperature. FIG. 5B is a graph showing a temperature change of the battery cells 16 during charging at the low temperature.

As shown in FIG. 5A, the temperature T of the battery cells 16 detected by the temperature detecting element 30 is below the lower limit value T1 of the predetermined temperature range. In this state, when the battery device 10 is mounted on the charger 50, the microcomputer 26 controls the control circuit 34 to not supply the externally-supplied charging current (the standard current Ic), which is supplied from the charger 50 to the battery device 10, to the battery cells 16 and supply an electric current obtained by adjusting the externally-supplied charging current (the standard current Ic) according to the temperature of the battery cells 16 only to the heater 32 as the second current I2.

Therefore, since the externally-supplied charging current supplied from the charger 50 to the battery device 10 is supplied to the heater 32, the heater 32 generates heat and the battery cells 16 are heated.

When the temperature T of the battery cells 16 detected by the temperature detecting element 30 rises above the lower limit value T1 of the predetermined temperature range (time t0), the microcomputer 26 controls the control circuit 34 to stop the supply of the second current I2 to the heater 32 and supply an electric current optimum for the battery cells 16 obtained by adjusting the externally-supplied charging current to the battery cells 16 as the first current I1.

Thereafter, as at the room temperature, as the power charged in the battery cells 16 increases, the battery cell voltage Vb rises and the first current I1 gradually falls. When the first current I1 reaches a current value corresponding to the full charge at time t3, the charger 50 stops the charging operation. In this case, the battery cell voltage Vb has reached the full-charge battery cell voltage Vc.

In the first operation example, when temperature detected by the temperature detecting unit falls below the predetermined temperature range suitable for charging the battery cells 16, the current control unit stops the first current and supplies only the second current to the temperature control unit. When temperature detected by the temperature detecting unit reaches the predetermined temperature range, the current control unit supplies the first current to the battery cell and stops the supply of the second current to the temperature control unit.

In FIG. 5A, the first current I1 indicated by a broken line is the same as the first current I1 in FIG. 4A. Time t0 indicates time when the first current I1 reaches the current value corresponding to the full charge. Time t0 is shown for the purpose of comparison.

As shown in FIG. 5B, in a process of charging, the temperature of the battery cells 16 rises when the second current I2 is supplied to the heater 32. However, when the supply of the second current I2 stops at time t0, a gradient of the temperature rise becomes gentle. At time t3, when the charging current stops, the temperature of the battery cells 16 gradually falls.

When the temperature falls below the predetermined temperature range again, as described above, the microcomputer 26 splits the externally-supplied charging current into the first current I1 and the second current I2, limits the first current I1 charged in the battery cells 16, and supplies the second current I2 to the heater 32 again to control the temperature. In this way, it is possible to charge the battery cells 16 at the temperature optimum for the battery cells 16 and with the electric current optimum for the battery cells 16.

In the charging operation at the low temperature described above, while the charging current is supplied to the battery cells 16, the temperature of the battery cells 16 is kept in the predetermined temperature range by the microcomputer 26 and the control circuit 34.

In the explanation of the first operation example, the first current I1 changes stepwise from 0% to 100% of the externally-supplied charging current at the time when the temperature of the battery cells 16 reaches the predetermined temperature range and the second current I2 changes stepwise from 100% to 0% of the externally-supplied charging current. However, it goes without saying that the first and second currents I1 and I2 may change gently.

A second operation example of the charging operation at the low temperature lower than the predetermined temperature range will be explained.

In the second operation example, the battery cells 16 are heated using the heater 32 and, at the same time, the battery cells 16 are charged with a predetermined charging current enough for charging the battery cells 16 without deteriorating the battery cells 16. After the temperature of the battery cells 16 reaches the predetermined temperature range, the heating of the battery cells 16 is stopped and the battery cells 16 are charged with the standard charging current (see FIG. 7).

FIG. 6A is a graph showing changes in the charging current (the first current I1) supplied to the battery cells 16 and the battery cell voltage Vb during charging at a low temperature. FIG. 6B is a graph showing a temperature change of the battery cells 16 during charging at the low temperature.

As shown in FIG. 6B, the temperature T of the battery cells 16 detected by the temperature detecting element 30 is below the lower limit value T1 of the predetermined temperature range. In this state, when the battery device 10 is mounted on the charger 50, the microcomputer 26 controls the control circuit 34 to supply the first current I1 to the battery cells 16 as a predetermined charging current Ic' enough for charging the battery cells 16 without deteriorating the battery cells 16 and supply a current obtained by removing the predetermined charging current Ic' from the externally-supplied charging current (the standard current Ic) to the heater 32 as the second current I2.

Therefore, since the second current I2 is supplied to the heater 32, the heater 32 generates heat and the battery cells 16 are heated. At the same time, the battery cells 16 are charged with the predetermined charging current Ic' smaller than the standard current Ic. Therefore, although the battery cells 16 are charged in the state in which the temperature of the battery cells 16 is below the lower limit value T1 of the predetermined temperature range, deterioration of the battery cells 16 is controlled.

When the temperature T of the battery cells 16 detected by the temperature detecting element 30 rises above temperature T' slightly lower than the lower limit value T1 of the predetermined temperature range (time t01), the microcomputer 26 controls the control circuit 34 to gradually decrease the second current I2 supplied to the heater 32 and gradually increase the first current I1 supplied to the battery cells 16.

When the temperature T of the battery cells 16 rises above the lower limit value T1 of the predetermined temperature range (time t02), the second current I2 supplied to the heater 32 is reduced to zero and the heating of the battery cells 16 by the heater 32 is stopped. Most of the externally-supplied charging current changes to the first current I1 for charging the battery cells 16.

Thereafter, as at the room temperature, as the power charged in the battery cells 16 increases, the battery cell voltage Vb rises and the first current I1 gradually falls. When the first current I1 reaches the current value corresponding to the full charge at time t4, the charger 50 stops the charging operation. In this case, the battery cell voltage Vb has reached the full-charge battery cell voltage Vc.

When the temperature falls below the predetermined temperature range again during charging, as described above, the microcomputer 26 splits the externally-supplied charging current into the first current I1 and the second current I2, limits the first current I1 charged in the battery cells 16, and supplies the second current I2 to the heater 32 again to control the temperature. In this way, it is possible to charge the battery cells 16 at the temperature optimum for the battery cells 16 and with the electric current optimum for the battery cells 16.

In FIG. 6A, the first current I1 indicated by a broken line is the same as the first current I1 in FIG. 4A. Time t0 indicates time when the first current I1 reaches the current value corresponding to the full charge. Time t0 is shown for the purpose of comparison.

As shown in FIG. 6B, in a process of charging, the temperature of the battery cells 16 rises when the second current I2 is supplied to the heater 32. However, when the supply of the second current I2 stops at time t4, the temperature of the battery cells 16 gradually falls.

In the charging operation at the low temperature described above, the temperature of the battery cells 16 is below the lower limit value T1 in the beginning when the supply of the charging current to the battery cells 16 is started. However, thereafter, after the temperature of the battery cells 16 shifts into the predetermined temperature range according to the heating by the heater 32, while the charging current is supplied to the battery cells 16, the temperature of the battery cells 16 is kept in the predetermined temperature range by the microcomputer 26 and the control circuit 34.

In the explanation of the second operation example, when the temperature of the battery cells 16 reaches the predetermined temperature range, the first current I1 gradually increases gently from the predetermined charging current Ic' to the externally-supplied charging current (the standard current Ic) and the second current I2 decreases gently. However, it goes without saying that the first and second currents I1 and I2 may change stepwise.

The charging operation will be further explained with reference to flowcharts.

FIG. 7 is a flowchart for explaining the overall charging operation. FIG. 8 is a flowchart corresponding to the first operation example.

First, the overall charging operation will be explained with reference to FIG. 7.

When the battery device 10 is mounted on the charger 50, initial charging is performed (step S100). The initial charging is performed to test, by supplying a charging current of a relatively small value from the charger 50 to the battery device 10, whether the battery device 10 normally operates, for example, whether data communication is normally performed between the microcomputer 26 of the battery device 10 and the microcomputer 58 of the charger 50.

Subsequently, the microcomputer 26 of the battery device 10 judges whether the temperature T of the battery cells 16 detected by the temperature detecting element 30 is in an operation temperature range (step S101). The battery device 10 may not be able to normally operate at a high temperature or a low temperature deviating from this operation temperature range. Therefore, when it is judged that the temperature T of the battery cell deviates from the operation temperature range, the microcomputer 26 performs abnormal processing (controls the SWs 22 and 24 via the control IC 20) to prohibit the charging operation (step S105). It is judged that the temperature T of the battery cells 16 deviates from the operation temperature range, for example, when an environmental temperature deviates from the operation temperature range and when the battery cells 16 generate heat and the temperature T deviates from the operation temperature range because of a failure of the battery device 10 (the battery cells 16).

When the temperature T of the battery cells 16 is in the operation temperature range, the microcomputer 26 judges whether a battery power is sufficient (step S102). When the battery power is large, the microcomputer 26 controls the control circuit 34 and determines a maximum charging current as I1-1 (step S103). When the battery power is small, the microcomputer 26 determines a maximum charging current as I1-2 larger than I1-1 (step S104).

Subsequently, the microcomputer 26 executes temperature control described later and charges the battery cells 16 (step S106). The microcomputer 26 judges whether the battery cells 16 is fully charged (step S107).

When the battery cells 16 are fully charged, the microcomputer 26 finishes the charging. When the battery cells 16 are not fully charged, the microcomputer 26 returns to step S102.

An operation of temperature control corresponding to the first operation example will be explained in detail with reference to FIG. 8.

First, the microcomputer 26 of the battery device 10 judges whether the temperature T of the battery cells 16 detected by the temperature detecting element 30 is outside the predetermined temperature range (step S200).

Since it is unnecessary to perform the temperature control for the battery cells 16 when the temperature T is in the predetermined temperature range, the microcomputer 26 shifts to step S107.

When the temperature T is outside the predetermined temperature range, the microcomputer 26 controls the control circuit 34 to not supply the externally-supplied charging current (the standard current Ic), which is supplied from the charger 50 to the battery device 10, to the battery cells 16 and to adjust the externally supplied charging current according to the temperature T of the battery cells 16 detected by the temperature detecting element 30 and supply the externally-supplied charging current to the temperature control unit (the heater 32) as the second current I2 (step S201). The microcomputer 26 actuates a timer for judging whether a predetermined set time has elapsed from the start of step S201.

The microcomputer 26 of the battery device 10 judges whether the temperature T of the battery cells 16 has reached the predetermined temperature range (step S202).

When the temperature T has reached the predetermined temperature range, the microcomputer 26 controls the control circuit 34 to not supply the externally-supplied charging current (the standard current Ic), which is supplied from the charger 50 to the battery device 10, to the heater 32 (stops the supply of the second current I2 to the heater 32) and to supply an electric current optimum for the battery cells 16 obtained by adjusting the externally-supplied charging current to the battery cells 16 as the first current I1 (step S204). More specifically, the microcomputer 26 supplies the maximum charging current I1-1 or I1-2 set in steps S103 and S104 to the battery cells 16.

When the temperature T has not reached the predetermined temperature range, the microcomputer 26 judges whether time timed by the timer has exceeded the predetermined set time (step S203). When the time has not exceeded the predetermined set time, the microcomputer 26 returns to step S202. When the time has exceeded the predetermined set time, the microcomputer 26 judges that temperature control by the temperature control unit (the heater 32) is difficult. The microcomputer 26 controls the control circuit 34 and stops the supply of the externally-supplied charging current (the standard current Ic), which is supplied from the charger 50 to the battery device 10, to the temperature control unit (the heater 32) and supplies an electric current adjusted according to the temperature T of the battery cells 16 to the battery cell 12 as the first current I1 (step S205). The first current I1 in this case is an electric current smaller than the maximum charging currents I1-1 and I1-2.

As explained above, in the battery device 10 according to this embodiment, when it is detected that the temperature of the battery cells 16 deviates from the predetermined temperature range suitable for charging, the second current I2 split from the externally-supplied charging current is supplied to the temperature control unit (the heater 32) to supply the first current I1 split from the externally-supplied charging current to the battery cells 16 and charges the battery cells 16 while keeping the temperature of the battery cells 16 in the predetermined temperature range. This makes it possible to supply a charging current of a sufficient magnitude to the battery cells 16. Therefore, compared with the charging with the predetermined charging current enough for charging the battery cells 16 without deteriorating the battery cell when the temperature of the battery cells 16 deviates from the predetermined temperature range, it is possible to charge the battery cells 16 to sufficient power while reducing a charging time. Moreover, this is advantageous in controlling deterioration in the battery cells 16.

As the temperature detecting element used for the temperature detection of the battery cells 16, it is possible to use a temperature detecting element provided in a battery cell of the past. This is advantageous in controlling an increase in the number of components and an increase in cost.

It is unnecessary to provide, in the charger 50, a component for adjusting a charging current supplied to the battery device 10 according to an environmental temperature. Thus, it is possible to simplify a circuit configuration of the charger 50. This is advantageous in reducing a size, weight, and cost of the charger 50.

The battery device of the past will be explained as a comparative example.

Figure 16:
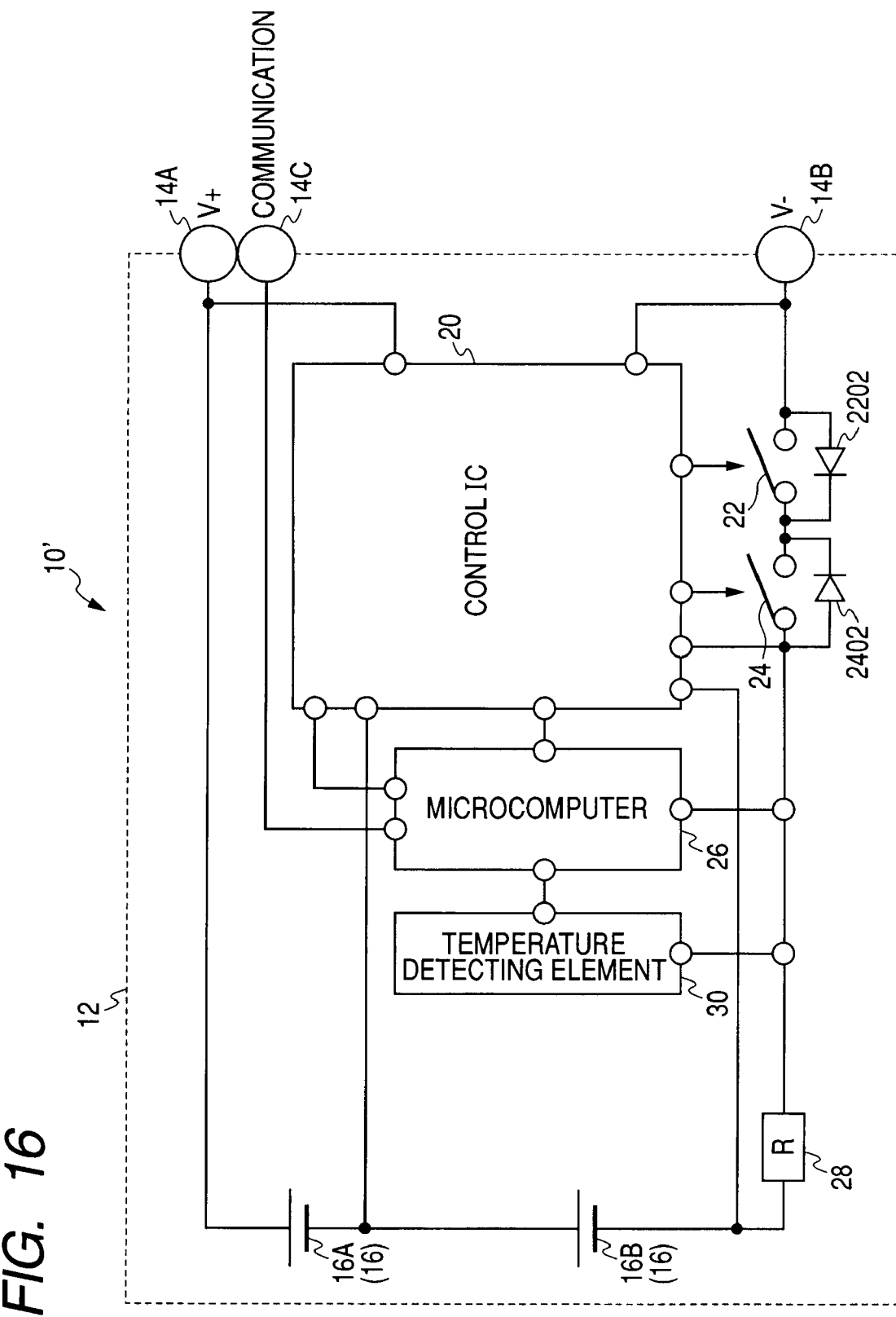
FIG. 16 is a block diagram showing a structure of a battery device of the past.
Figure 17:
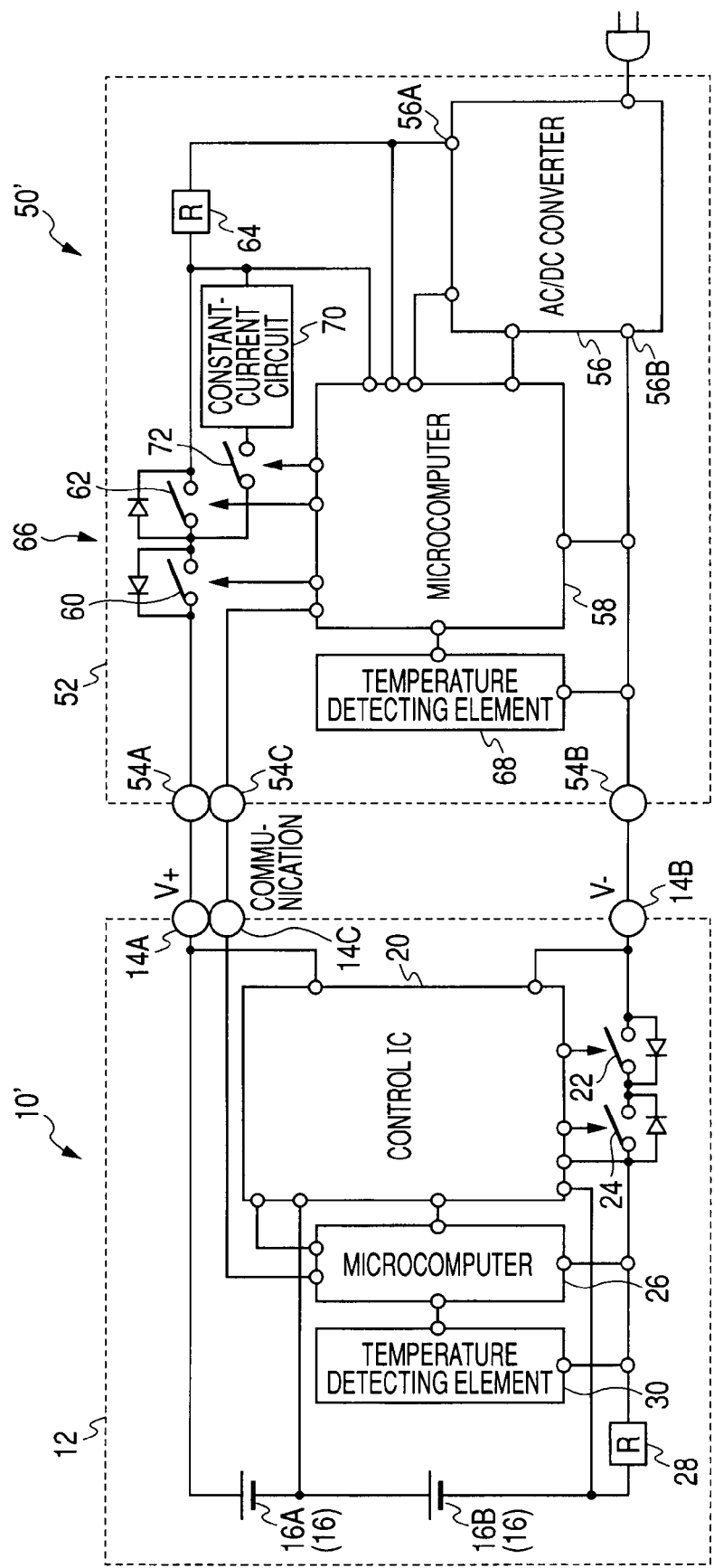
FIG. 17 is a block diagram showing a state in which the battery device of the past is mounted on a charger.

FIG. 16 is a block diagram showing a structure of the battery device of the past. FIG. 17 is a block diagram showing a state in which the battery device of the past is mounted on a charger. FIG. 18A is a graph showing changes in the charging current (the first current I1) supplied to the battery cells 16 and the battery cell voltage Vb during charging at a low temperature. FIG. 18B is a graph showing a temperature change of the battery cells 16 during charging at the low temperature. In FIGS. 16, 17, and 18 and embodiments described later, components and members same as those in the first embodiment are denoted by the identical reference numerals and signals.

As shown in FIG. 16, unlike the battery device 10 according to the first embodiment shown in FIG. 2, a battery device 10' of the past does not include the heater 32 and the control circuit 34.

As shown in FIG. 17, unlike the charger 50 shown in FIG. 3, a charger 50' in the past includes a temperature detecting element 68, a constant current circuit 70, and a switch 72.

As shown in FIG. 18B, an environmental temperature of the charger 50' detected by the temperature detecting element 68 is below the lower limit value T1 of the predetermined temperature range. In this state, when the battery device 10' is mounted on the charger 50', the microcomputer 26 turns on a switch 72 to cause the constant current circuit 70 to function to set, as a charging current supplied to the battery device 10', the predetermined charging current Ic' that is smaller than the standard current Ic and enough for charging the battery cells 16 without deteriorating the battery cells 16.

The battery cells 16 are charged with the predetermined charging current Ic' and, as power charged in the battery cells 16 increases, the battery cell voltage Vb rises and the charging current I' gradually falls. When the charging current I' reaches a current value corresponding to the full charge at time t2, the charger 50' stops the charging operation. In this case, the battery cell voltage Vb has reached the full charge battery cell voltage Vc.

In FIG. 18A, the charging current I' indicated by a broken line indicates a charging process performed when the environmental temperature of the charger 50' detected by the temperature detecting element 68 is in the predetermined temperature range and the charging current I' is the standard current Ic. In that case, the battery cell voltage Vb reaches the full charge battery cell voltage Vc at time t1.

Here, time t3 when the charging is completed in FIG. 5A showing the first operation example and time t4 when the charging is completed in FIG. 6A showing the second operation example are compared with time t2 when the charging is completed in FIG. 18A. As it is evident from the comparison, in the battery device 10 according to this embodiment, when the temperature of the battery cells 16 deviates from the predetermined temperature range suitable for charging, a charging time necessary for fully charging the battery cells 16 is substantially reduced compared with that in the past.

In the charger 50' that charges the battery device 10' in the past, it is necessary to provide the temperature detecting element 68, the constant current circuit 70, the switch 72, and the like. On the other hand, such components are unnecessary in the charger 50 that charges the battery device 10 according to this embodiment. A circuit configuration of the charger 50 is simplified and advantageous.

Second Embodiment

A second embodiment of the present invention is different from the first embodiment in that the battery cells 16 are cooled at a high temperature.

FIG. 9A is a perspective view of the battery device 10 according to the second embodiment. FIG. 9B is a perspective view of the battery device 10 from which the upper case 1204 is removed.

In the second embodiment, instead of the heater 32 in the first embodiment, a Peltier element 74 is provided as a heat absorbing element that absorbs heat to cool the battery cells 16 when an electric current is supplied thereto. In other words, in this embodiment, a temperature control unit includes the Peltier element 74.

As shown in FIG. 9B, the Peltier element 74 is provided to cover the outer periphery of the two battery cells 16. In this embodiment, as shown in FIG. 2, one end of the Peltier element 74 is connected to the battery-side positive electrode terminal 14A via the control circuit 34 and the other end is connected to a negative electrode (GND) of the battery cell 16B via the current detection resistor 28.

A heat absorbing effect of the battery cells 16 by the Peltier element 74 may be improved by covering the surface of the Peltier element 74 with a metal plate having high thermal conductivity. The temperature control unit is not limited to such a structure including the heat absorbing element formed by the Peltier element 74. It is possible to adopt structures including various publicly-known heat absorbing elements that absorb heat using an electric current.

The heat absorbing element is not limited to the Peltier element 74. It is possible to adopt various publicly known heat absorbing elements that absorb heat using an electric current.

An operation example in the second embodiment will be explained with reference to FIG. 2.

A first operation example of a charging operation at a high temperature higher than the predetermine temperature range will be explained.

In this first operation example, the battery cells 16 are cooled to the predetermined temperature range using the Peltier element 74 and, after the temperature of the battery cells 16 reaches the predetermined temperature range, the cooling by the Peltier element 74 is stopped and the battery cells 16 are charged with the standard charging current.

In some state, the temperature T of the battery cells 16 detected by the temperature detecting element 30 is above the upper limit value T2 of the predetermined temperature range. In this state, when the battery device 10 is mounted on the charger 50, the microcomputer 26 does not supply the externally-supplied charging current (the standard current Ic), which is supplied from the charger 50 to the battery device 10, to the battery cells 16 and supplies the second current I2 to the Peltier element 74 as an electric current corresponding to the temperature.

Therefore, when the externally-supplied charging current, which is supplied from the charger 50 to the battery device 10, is supplied to the Peltier element 74, the Peltier element 74 absorbs heat and the battery cells 16 are cooled.

When the temperature T of the battery cells 16 detected by the temperature detecting element 30 falls below the upper limit value T2 of the predetermined temperature range, the microcomputer 26 controls the control circuit 34 to stop the supply of the second current I2 to the Peltier element 74 and supply an electric current optimum for the battery cells 16 obtained by adjusting the externally-supplied charging current to the battery cells 16 as the first current I1.

Thereafter, as at the room temperature, as the power charged in the battery cells 16 increases, the battery cell voltage Vb rises and the first current I1 gradually falls. When the first current I1 reaches a current value corresponding to the full charge, the charger 50 stops the charging operation. In this case, the battery cell voltage Vb has reached the full-charge battery cell voltage Vc.

In the first operation example, when temperature detected by the temperature detecting unit rises above the predetermined temperature range suitable for charging the battery cells 16, the current control unit stops the first current and supplies only the second current to the temperature control unit. When temperature detected by the temperature detecting unit reaches the predetermined temperature range, the current control unit supplies the first current to the battery cell and stops the supply of the second current to the temperature control unit.

When the temperature rises above the predetermined temperature range again during charging, as described above, the current control unit splits the externally-supplied charging current into the first current and the second current, limits an electric current charged in the battery cells 16, and actuates the Peltier element 74 again to control the temperature. In this way, it is possible to charge the battery cells 16 with the temperature optimum for the battery cells 16 and with the electric current optimum for the battery cells 16.

In the charging operation at the high temperature described above, while the charging current is supplied to the battery cells 16, the temperature of the battery cells 16 is kept in the predetermined temperature range by the microcomputer 26 and the control circuit 34.

This first operation can also be explained according to a flowchart shown in FIG. 8.

A second operation example of the charging operation at the high temperature higher than the predetermined temperature range will be explained.

In the second operation example, the battery cells 16 are cooled using the Peltier element 74 and, at the same time, the battery cells 16 are charged at the predetermined charging current. After the temperature of the battery cell 16 reaches the predetermined temperature range, the cooling of the battery cells 16 is stopped to charge the battery cells 16 with the standard charging current.

In some state, the temperature T of the battery cells 16 detected by the temperature detecting element 30 is above the upper limit value T2 of the predetermined temperature range. In this state, when the battery device 10 is mounted on the charger 50, the microcomputer 26 controls the control circuit 34 to supply the first current I1 to the battery cells 16 as the predetermined charging current Ic' that is enough for charging the battery cells 16 without deteriorating the battery cells 16 and supply an electric current obtained by deducting the predetermined charging current Ic' from the externally-supplied charging current (the standard current Ic) to the Peltier element 74 as the second current I2.

Therefore, when the second current I2 is supplied to the Peltier element 74, the Peltier element 74 absorbs heat to cool the battery cells 16 and, at the same time, the battery cells 16 are charged with the predetermined charging current Ic' smaller than the standard current Ic. Therefore, even in the charging in the state in which the temperature of the battery cells 16 is above the upper limit value T2 of the predetermined temperature range, deterioration in the battery cells 16 is controlled.

When the temperature T of the battery cells 16 detected by the temperature detecting element 30 falls below temperature T2' slightly higher than the upper limit value T2 of the predetermined temperature range, the microcomputer 26 controls the control circuit 34 to gradually increase the first current I1 supplied to the battery cells 16 and gradually decrease the second current I2 supplied to the Peltier element 74.

When the temperature T of the battery cells 16 falls below the upper limit value T2 of the predetermined temperature range, the second current I2 supplied to the Peltier element 74 is reduced to zero and the cooling of the battery cells 16 by the Peltier element 74 is stopped. Most of the externally-supplied charging current changes to the first current I1 for charging the battery cells 16.

Thereafter, as at the room temperature, as the power charged in the battery cells 16 increases, the battery cell voltage Vb rises and the first current I1 gradually falls. When the first current I1 reaches the current value corresponding to the full charge, the charger 50 stops the charging operation. In this case, the battery cell voltage Vb has reached the full-charge battery cell voltage Vc.

When the temperature rises above the predetermined temperature range again during charging, as described above, the microcomputer 26 splits the externally-supplied charging current into the first current I1 and the second current I2, limits the first current in the battery cells 16, and actuates the Peltier element 74 again to control the temperature. In this way, it is possible to charge the battery cells 16 at the temperature optimum for the battery cells 16 and with the electric current optimum for the battery cells 16.

In the charging operation at the low temperature described above, the temperature of the battery cells 16 is below the upper limit value T2 of the predetermined temperature range in the beginning when the supply of the charging current to the battery cells 16 is started. However, thereafter, when the temperature of the battery cells 16 once shifts to the predetermined temperature range according to the cooling by the Peltier element 17, while the charging current is supplied to the battery cells 16, the temperature of the battery cells 16 is kept in the predetermined temperature range by the microcomputer 26 and the control circuit 34.

Therefore, in the battery device 10 according to the second embodiment, as in the first embodiment, when it is detected that the temperature of the battery cells 16 deviates from the predetermined temperature range suitable for charging, the second current I2 split from the externally-supplied charging current is supplied to the temperature control unit (the Peltier element 74) to supply the first current I1 split from the externally-supplied charging current to the battery cells 16 and charges the battery cells 16 while keeping the temperature of the battery cells 16 in the predetermined temperature range. This makes it possible to supply a charging current of a sufficient magnitude to the battery cells 16. Therefore, compared with the charging with the predetermined charging current enough for charging the battery cells 16 without deteriorating the battery cell 16 when the temperature of the battery cells 16 deviates from the predetermined temperature range, it is possible to charge the battery cells 16 to sufficient power while reducing a charging time. Moreover, this is advantageous in controlling deterioration in the battery cells 16.

As in the first embodiment, it is unnecessary to provide, in the charger 50, a component for adjusting a charging current supplied to the battery device 10 according to an environmental temperature. This is advantageous in simplifying the circuit configuration of the charger 50.

Third Embodiment

A battery device according to a third embodiment of the present invention is a combination of the battery devices according to the first and second embodiments.

Figure 10B:
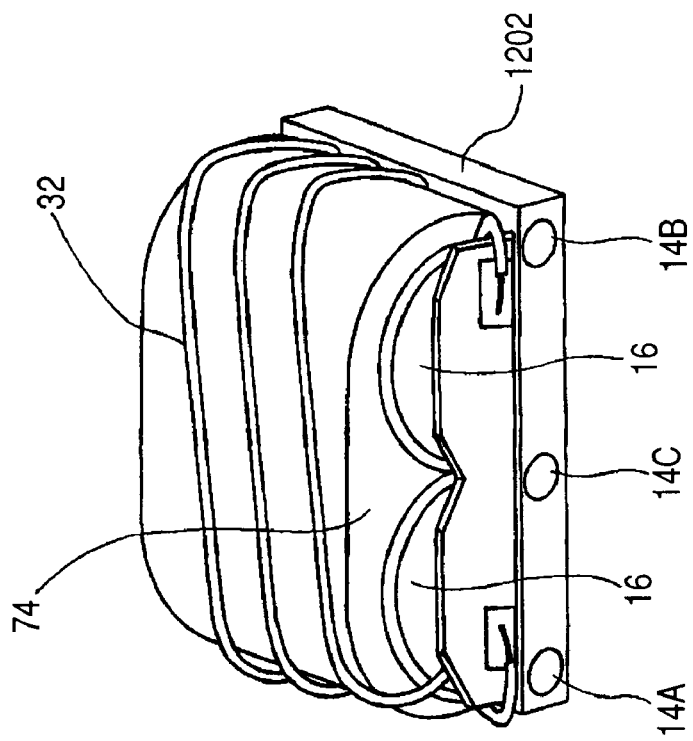
FIG. 10B is a perspective view of the battery 10 from which the upper case 1204 is removed.
Figure 10A:
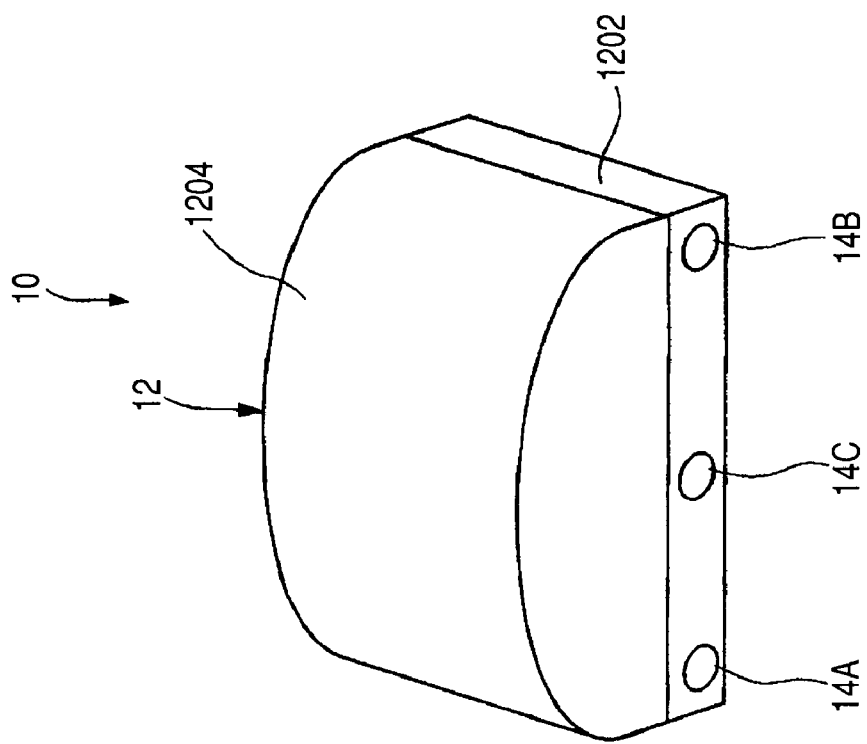
FIG. 10A is a perspective view of the battery device 10 according to a third embodiment of the present invention.
Figure 11:
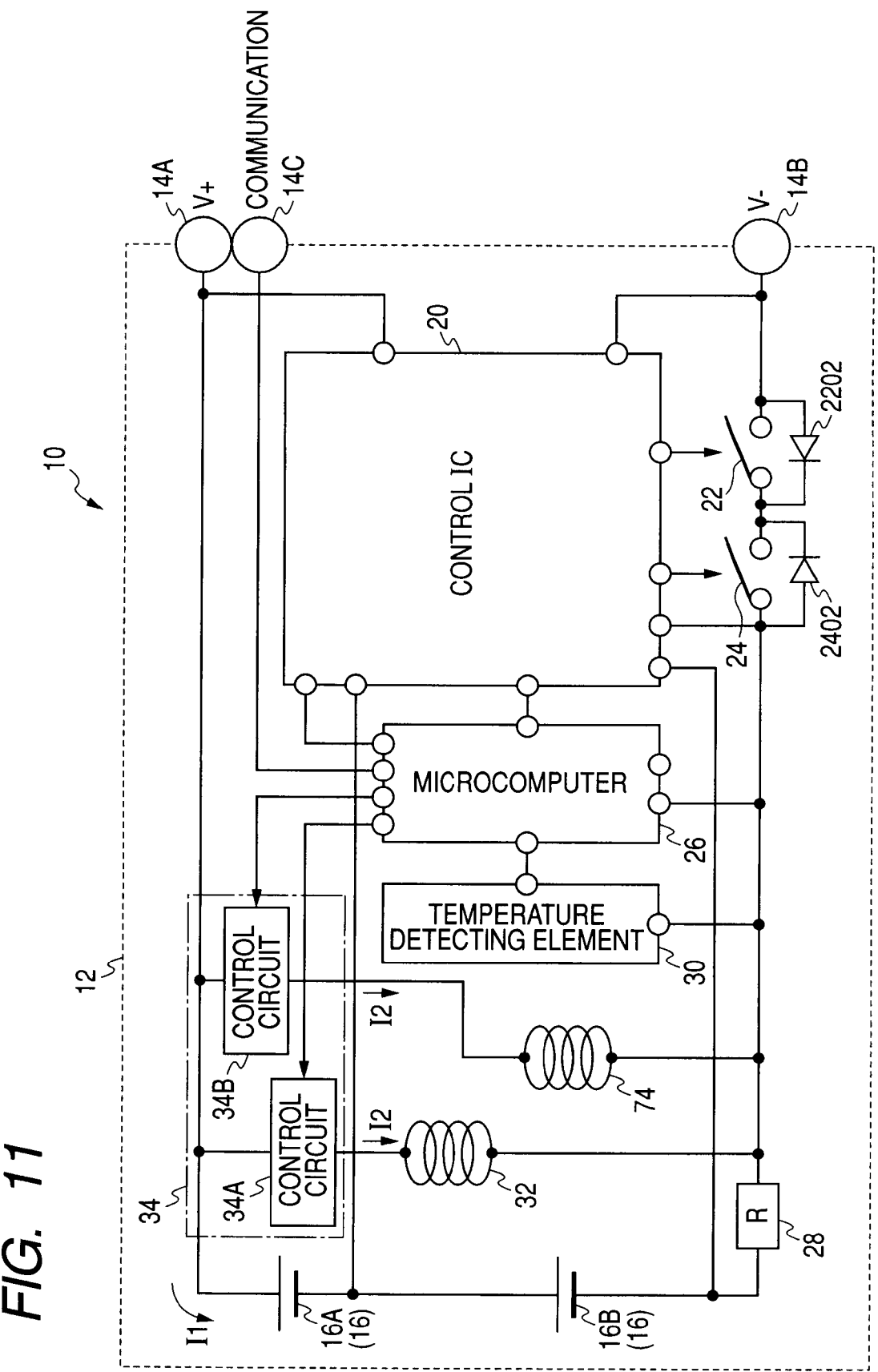
FIG. 11 is a block diagram showing a structure of the battery device 10 according to the third embodiment.

FIG. 10A is a perspective view of the battery device 10 according to the third embodiment. FIG. 10B is a perspective view of the battery device 10 from which the upper case 1204 is removed. FIG. 11 is a block diagram showing a structure of the battery device 10 according to the third embodiment.

As shown in FIG. 10B, the Peltier element 74 is provided on the outer periphery of the battery cells 16 and the heater 32 is wound around the Peltier element 74. Therefore, a temperature control unit includes the heater 32 (a heat generating element) and the Peltier element 74 (a heat absorbing element).

As shown in FIG. 11, the control circuit 34 includes a first control circuit 34A that splits the second current I2 from the externally-supplied charging current to the heater 32 and a second control circuit 34B that splits the second current I2 from the externally-supplied charging current to the Peltier element 74.

At low temperature, as in the first embodiment, the first control circuit 34A is controlled by the microcomputer 26 to heat the battery cells 16 using the heater 32.

At high temperature, as in the second embodiment, the second control circuit 34B is controlled by the microcomputer 26 to cool the battery cells 16 using the Peltier element 74.

According to the third embodiment, both the effects of the first and second embodiments are realized. It is possible to charge the battery cells 16 to sufficient power while reducing a charging time even in temperature environments at the low temperature and the high temperature. This is advantageous in controlling deterioration in the battery cells 16.

Fourth Embodiment

A fourth embodiment of the present invention is different from the first embodiment in that it is possible to manually select execution and non-execution of temperature control for the battery cells 16.

Figure 12B:
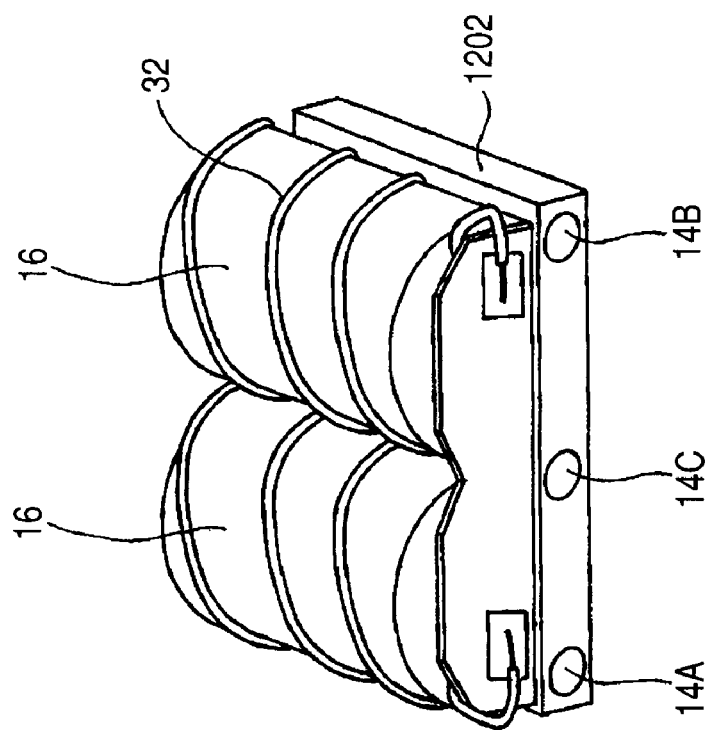
FIG. 12B is a perspective view of the battery device 10 from which the upper case 1204 is removed.
Figure 12A:
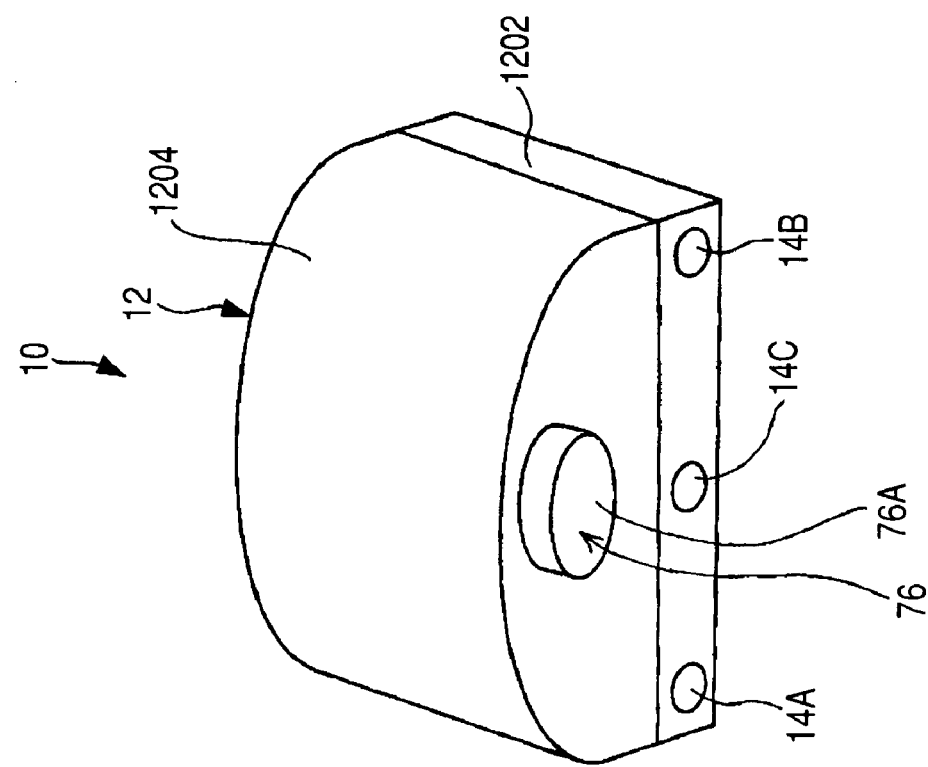
FIG. 12A is a perspective view of the battery device 10 according to a fourth embodiment of the present invention.
Figure 13:
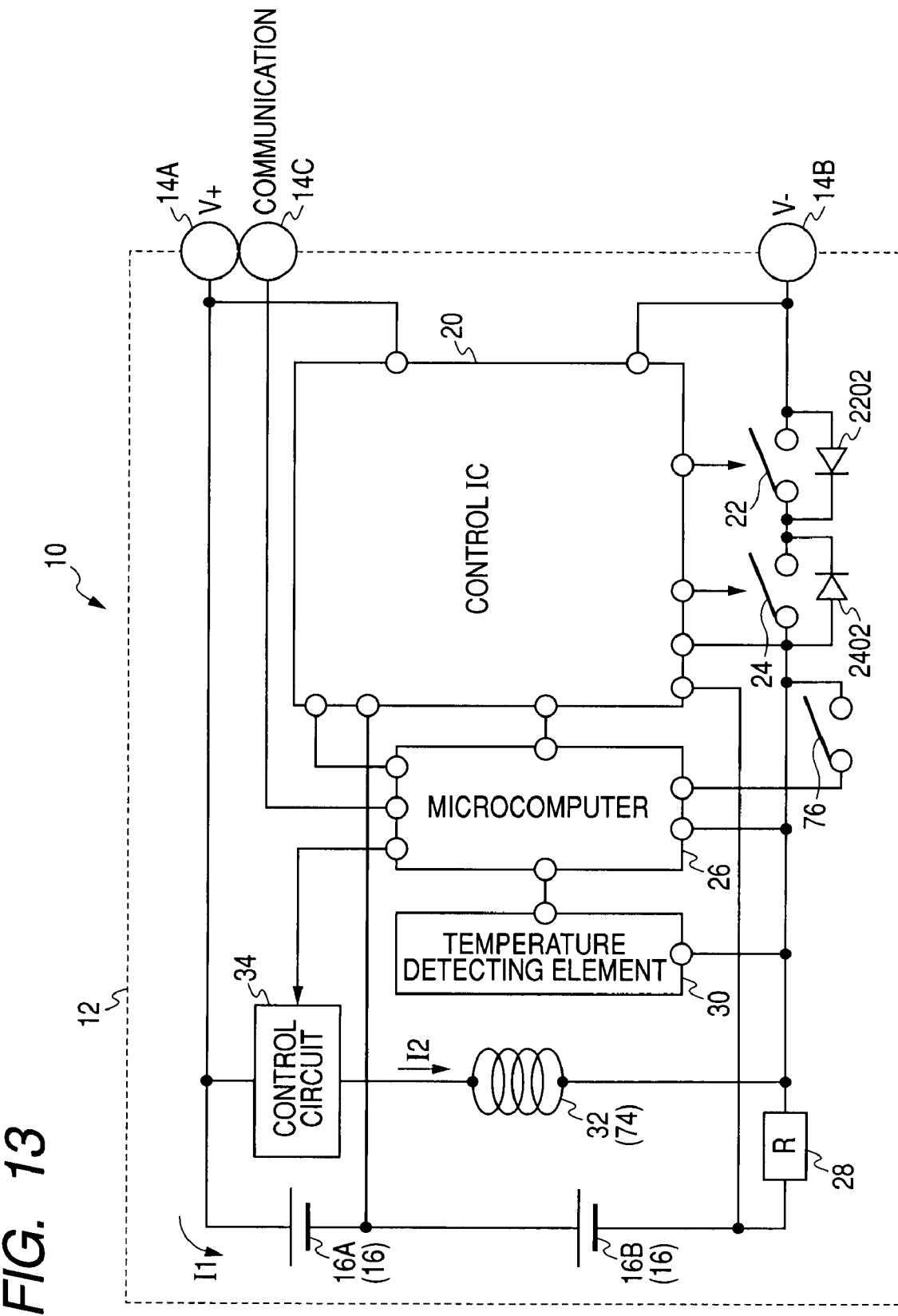
FIG. 13 is a block diagram showing a structure of the battery device 10 according to the fourth embodiment.

FIG. 12A is a perspective view of the battery device 10 according to the fourth embodiment. FIG. 12B is a perspective view from which the upper case 1204 is removed from the battery device 10. FIG. 13 is a block diagram showing a structure of the battery device 10 according to the fourth embodiment.

As shown in FIGS. 12A and 12B, an automatic temperature control switch 76 to be pressed is provided on the side of the case 12. The automatic temperature control switch 76 is constituted by, for example, a press button switch. The automatic temperature control switch 76 is repeatedly turned on and off every time an operation member 76A is pressed.

As shown in FIG. 13, the automatic temperature control switch 76 is connected to the microcomputer 26. The microcomputer 26 enters a first charging mode when the automatic temperature control switch 76 is turned on and enters a second charging mode when the automatic temperature control switch 76 is turned off.

In the first charging mode, as in the first embodiment, the microcomputer 26 supplies the second current I2 to the heater 32 according to the temperature of the battery cells 16 to heat the battery cells 16 and adjust the temperature of the battery cells 16 to an optimum temperature range.

In the second charging mode, the microcomputer 26 does not perform the temperature control corresponding to the temperature of the battery cells 16 and controls the control circuit 34 such that the externally-supplied charging current is entirely supplied to the battery cells 16 regardless of temperature detected by the temperature detecting element 30.

In other words, it is possible to set the current control unit including the microcomputer 26 and the control circuit 34 in a first charging operation mode for allowing an operation of the current control unit or a second charging operation mode for entirely supplying the externally-supplied charging current to the battery cells 16 regardless of a temperature detection result of the temperature detecting unit 30.

Therefore, in the battery device 10 according to the fourth embodiment, if the automatic temperature control switch 76 is operated to set the microcomputer 26 in the second charging mode, when the battery device 10 is mounted on the charger 50' that charges the battery cells 16 using a predetermined charging current (a charging current small enough for preventing deterioration in the battery cells 16) according to a temperature environment as shown in FIG. 16, it is possible to charge the battery cells 16 to the full charge with the predetermined charging current. In other words, it is possible to use the battery device 10 in the same manner as the battery device in the past.

If the automatic temperature control switch 76 is operated to set the microcomputer 26 in the first charging mode, it is possible to charge the battery device 10 in an operation same as that in the first embodiment.

Consequently, for example, when it is unnecessary to quickly charge the battery cells 16 and a user desires to charge the battery cells 16 slowly, it is possible to select a method of charging of the battery device 10.

In the explanation of the fourth embodiment, the temperature control unit includes the heater 32 (the heat generating element). However, it goes without saying that the same effect is realized even when the temperature control unit includes the Peltier element 74 (the heat absorbing element).

Further, it goes without saying that the same effect is realized when the modes on the battery side are switched by a signal of the microcomputer 58 on the charger side by performing communication between the microcomputer 26 in the battery device 10 and the microcomputer 58 in the charger 50 using the communication terminal 14C and the communication terminal 54C.

Fifth Embodiment

In a fifth embodiment of the present invention, it is possible to perform temperature control for the battery cells 16 during discharge.

In the fifth embodiment, a structure of the battery device 10 is the same as that shown in FIG. 2.

Figure 14:
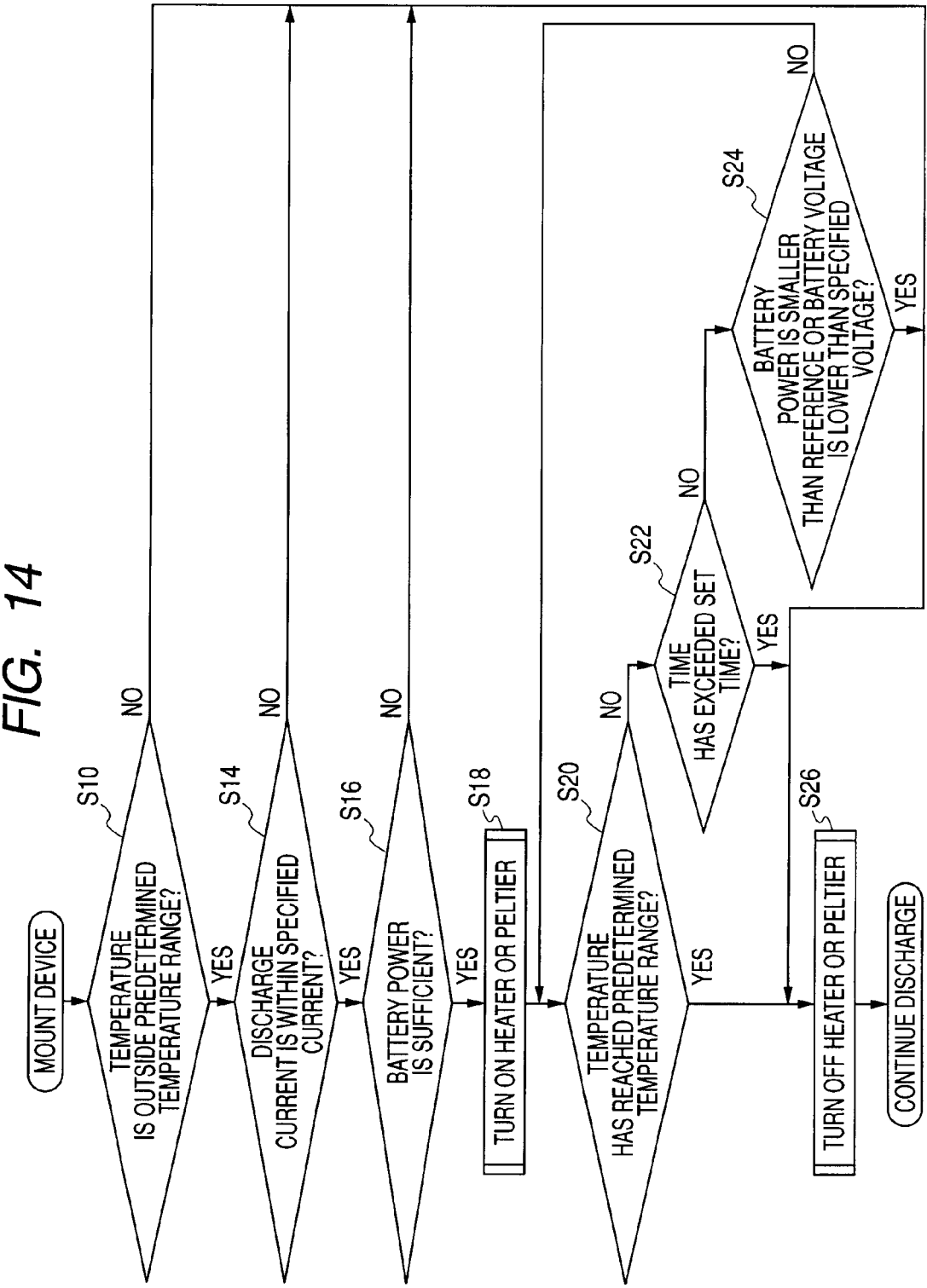
FIG. 14 is a flowchart showing operations during discharge of the battery device 10 according to a fifth embodiment of the present invention.

FIG. 14 is a flowchart showing operations during discharge of the battery device 10 according to the fifth embodiment.

When the microcomputer 26 detects that the battery device 10 is connected to an electronic apparatus in use according to, for example, communication performed by using the battery side communication terminal 14C, the microcomputer 26 judges whether a detected temperature of the temperature detecting element 30 is in a predetermined temperature range in which a charging current can be satisfactorily extracted from the battery cells 16 and discriminates whether it is necessary to adjusts the temperature of the battery cells 16 (heat or cool the battery cells 16) (step S10).

When it is unnecessary to adjust the temperature of the battery cells 16, the microcomputer 26 controls the control circuit 34 to shift to a normal discharge mode for not supplying an electric current to the heater side and supplying an entire discharge current of the battery cells 16 to the outside via the battery-side positive electrode terminal 14A and the battery-side negative electrode terminal 14B (step S26).

When it is necessary to adjust the temperature of the battery cells 16, the microcomputer 26 discriminates whether a discharge current during discharge is below a predetermined value (step S14) and sufficient power enough for supplying an electric current to the heater 32 remains in the battery cells 16 (step S16). When the discharge current is above the predetermined value or when the sufficient power does not remain, the microcomputer 26 shifts to the normal discharge mode. The discharge current is calculated by the control IC 20 using the current detection resistor 28 as described above.

When it is discriminated in step S16 that the sufficient power remains, the microcomputer 26 shifts to a temperature control discharge mode for supplying an electric current to the heater 32 to heat the battery cells 16 (step S18). The microcomputer 26 controls the control circuit 34 to divide the discharge current of the battery cells 16 into a first discharge current supplied to the outside via the battery-side positive electrode terminal 14A and the battery-side negative electrode terminal 14B and a second discharge current supplied to the heater 32. Consequently, the microcomputer 26 causes the heater 32 to generate heat and heats the battery cells 16.

Subsequently, the microcomputer 26 discriminates whether a detected temperature of the temperature detecting element 30 has reached the predetermined temperature range (step S20). The microcomputer 26 discriminates whether a supply time of the second discharge current has exceeded a predetermined time (step S22). Since the operation of the heater 32 leads to consumption of the power of the battery cells 16, usage time of the battery cells 16 is reduced. Thus, a useless long operation of the heater 32 causes an adverse effect. Therefore, the predetermined time is set and, when a desired temperature of the battery cells 16 is not obtained even if the heater 32 operates for a fixed time, it is possible to stop current supply to the heater 32 and prevent waste of battery power.

Moreover, the microcomputer 26 discriminates whether battery power has fallen below a reference or a battery voltage has fallen during the operation of the heater 32 (step S24).

When any one of the conditions in steps S18, S20, and S24 is satisfied, the microcomputer 26 stops the second discharge current supplied to the heater 32 and finishes the heating of the battery cells 16 (step S26). In other words, the microcomputer 26 controls the control circuit 34 to supply the entire discharge current of the battery cells 16 as the first discharge current.

When it is discriminated in step S24 that the battery power has not fallen below the reference or the battery voltage has not fallen, the microcomputer 26 returns to step S18.

According to the fifth embodiment, an effect same as that in the first embodiment is realized. Moreover, since the temperature control for the battery cells 16 is performed even during discharge of the battery device 10, it is possible to extract a sufficient discharge current even when an environmental temperature is low. This is advantageous in improving convenience of used of the battery device 10.

In the explanation of the fifth embodiment, the temperature control unit includes the heater 32 (the heat generating element). However, the temperature control unit may include the Peltier element 74 (the heat absorbing element) In that case, even when an environmental temperature is high, it is possible to extract a sufficient discharge current (obtain a satisfactory discharge characteristic). This is advantageous in improving convenience of use of the battery device 10. If both the heat generating element and the heat absorbing element are provided, it is possible to extract a sufficient discharge current even if an environmental temperature is low or high. This is more advantageous in improving convenience of use of the battery device 10.

In the fifth embodiment, the microcomputer 26 discriminates the normal discharge mode and the temperature control discharge mode on the basis of a detected temperature of the temperature detecting element 30. However, a manually operable automatic temperature control switch may be provided to make it possible to select the normal discharge mode and the temperature control discharge mode with the operation of the switch as a trigger.

Figure 15:
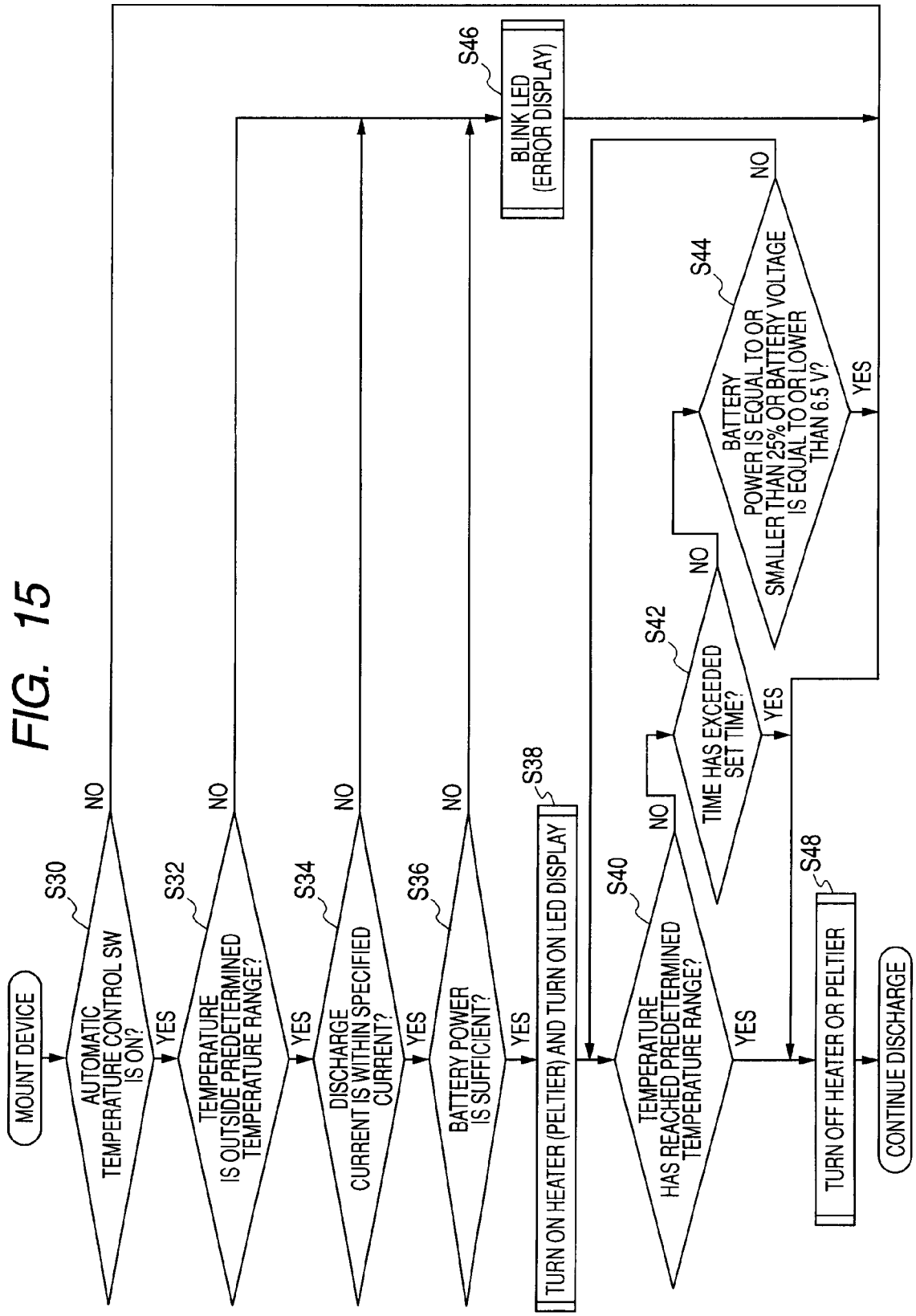
FIG. 15 is a flowchart showing operations during discharge in a modification of the battery device 10 according to the fifth embodiment.

As shown in a flowchart in FIG. 15, the microcomputer 26 judges whether the automatic temperature control switch is on in a state in which the battery device 10 is connected to an electronic apparatus in use (step S30). When the automatic temperature control switch is not on, the microcomputer 26 shifts to the normal discharge mode for not supplying an electric current to the heater side and supplying the entire discharge current of the battery cells 16 to the outside via the battery-side positive electrode terminal 14A and the battery-side negative electrode terminal 14B (step S48).

When it is judged that the automatic temperature control switch is on, the microcomputer 26 judges whether a detected temperature of the temperature detecting element 30 is in a predetermined temperature range in which a charging current can be satisfactorily extracted from the battery cells 16 and discriminates whether it is necessary to adjust the temperature of the battery cells 16 (step S32).

When it is unnecessary to adjust the temperature of the battery cells 16, the microcomputer 26 controls the control circuit 34 to perform error display by, for example, causing a not-shown display unit of an LED or the like to blink (step S46). The microcomputer 26 shifts to the normal discharge mode for not supplying an electric current to the heater side and supplying the entire discharge current of the battery cells 16 to the outside via the battery-side positive electrode terminal 14A and the battery-side negative electrode terminal 14B (step S48).

When it is necessary to adjust the temperature of the battery cells 16, the microprocessor 26 discriminates whether a discharge current during discharge is below a predetermined value (step S34) and power sufficient for supplying an electric current to the heater 32 remains in the battery cells 16 (step S36). When the discharge current is above the predetermined value or the power does not remain in the battery cells 16, the microprocessor 26 shifts to the normal discharge mode. As described above, the discharge current is calculated by the control IC 20 using the current detection resistor 28.

When the discharge current is below the predetermined value and the power remains in the battery cells 16, the microcomputer 26 shifts to the temperature control discharge mode for supplying an electric current to the heater 32 to heat the battery cells 16 (step S38). The microcomputer 26 controls the control circuit 34 to divide the discharge current of the battery cells 16 into a first discharge current supplied to the outside via the battery-side positive electrode terminal 14A and the battery-side negative electrode terminal 14B and a second discharge current supplied to the heater 32. Consequently, the microcomputer 26 causes the heater 32 to generate heat and heats the battery cells 16. At the same time, the microprocessor 26 indicates, by causing the display unit to blink, that the temperature control is being performed.

Subsequently, the microcomputer 26 discriminates whether a detected temperature of the temperature detecting element 30 has reached the predetermined temperature range (step S40). The microcomputer 26 discriminates whether a supply time of the second discharge current has exceeded a predetermined time (step S42). Since the operation of the heater 32 leads to consumption of the power of the battery cells 16, usage time of the battery cells 16 is reduced. Thus, a useless long operation of the heater 32 causes an adverse effect. Therefore, the predetermined time is set and, when a desired temperature of the battery cells 16 is not obtained even if the heater 32 operates for a fixed time, it is possible to stop current supply to the heater 32 and prevent waste of battery power.

Moreover, the microcomputer 26 discriminates whether battery power has fallen below a reference or a battery voltage has fallen during the operation of the heater 32 (step S44). In this example, a determination reference is whether the battery power has fallen below 25% or the output voltage has fallen below 6.5 V. As an example, in the battery cells 16, two cells of lithium ion batteries are connected in series. In that case, a representative value of the output voltage is 7.2 V and a minimum value and a maximum value thereof are 6 V and 8.4 V, respectively.

When any one of the conditions in steps S40, S42, and S44 is satisfied, the microcomputer 26 stops the second discharge current supplied to the heater 32 and finishes the heating of the battery cells 16 (step S48). In other words, the microcomputer 26 controls the control circuit 34 to use the entire discharge current of the battery cells 16 as the first discharge current.

When it is discriminated in step S44 that the battery power has not fallen below the reference or the battery voltage has not fallen, the microcomputer 26 returns to step S40.

In the first to fourth embodiments, in some state, the battery cells 16 are not charged with the normal charging current and the second current I2 split from the externally-supplied charging current is supplied to the temperature control unit or the battery cells 16 are charged with the predetermined charging current (e.g., a charging current small enough for not causing deterioration in the battery cells 16). In other words, it is necessary to inform the user of a state in which the battery cells 16 are charged with a small charging current compared with the normal charging operation. In this state, a display unit of an LED or the like may be provided in the case 12 of the battery device 10 to cause the display unit to indicate to that effect with lighting or blinking of the LED. Alternatively, data indicating to that effect may be transmitted from the microcomputer 26 to the charger 50 via the battery-side communication terminal 14C to cause a display device provided in the charger 50 to display the data.

It should be understood by those skilled in the art that various modifications, combinations, sub-combinations, and alterations may occur depending on design requirements and other factors insofar as they are within the scope of the appended claims or the equivalents thereof.

What is claimed is:

1. A battery device comprising:
a battery cell including a secondary cell;
a case that houses the battery cell;
a battery-side positive electrode terminal and a battery-side negative electrode terminal electrically provided in the case and connected to the battery cell;
a temperature detecting unit configured to detect a temperature of the battery cell;
a temperature control unit configured to heat the battery cell when the temperature drops below a predetermined temperature range, and to cool the battery cell when the temperature rises above the predetermined temperature range, when an electric current is supplied thereto; and
a current control unit, including a processor, configured to divide, according to the temperature detected by the temperature detecting unit, an externally-supplied charging current supplied from an external source to the battery-side positive electrode terminal and the battery-side negative electrode terminal into a first current that supplies the battery cell and a second current that supplies the temperature control unit.

2. A battery device according to claim 1, wherein
the temperature control unit includes a heat generating element that generates heat to heat the battery cell when the second current is supplied thereto, and
the current control unit
stops the first current to the battery cell and supplies the second current to the temperature control unit, when the temperature detected by the temperature detecting unit falls below the predetermined temperature range suitable for charging the battery cell, and
supplies the first current to the battery cell and stops the second current to the temperature control unit, when the temperature detected by the temperature detecting unit reaches the predetermined temperature range.

3. A battery device according to claim 1, wherein
the temperature control unit includes a heat generating element that generates heat to heat the battery cell when the second current is supplied thereto, and
the current control unit
supplies a predetermined current for charging the battery cell without deteriorating the battery cell as the first current to the battery cell, and supplies a remaining current equal to the externally-supplied charging current minus the predetermined charging current as the second current to the temperature control unit, when the temperature detected by the temperature detecting unit falls below the predetermined temperature range suitable for charging the battery cell, and
stops the second current to the temperature control unit, when the temperature detected by the temperature detecting unit reaches the predetermined temperature range.

4. A battery device according to claim 1, wherein
the temperature control unit includes a heat absorbing element that absorbs heat to cool the battery cell when the second current is supplied thereto, and
the current control unit
stops the first current to the battery cell and supplies the second current to the temperature control unit, when the temperature detected by the temperature detecting unit rises above the predetermined temperature range suitable for charging the battery cell, and
supplies the first current to the battery cell and stops the second current to the temperature control unit, when the temperature detected by the temperature detecting unit reaches the predetermined temperature range.

5. A battery device according to claim 1, wherein
the temperature control unit includes a heat absorbing element that absorbs heat to cool the battery cell when the electric current is supplied thereto, and
the current control unit
supplies a predetermined current for charging the battery cell without deteriorating the battery cell as the first current to the battery cell, and supplies a remaining current equal to the externally-supplied charging current minus the predetermined charging current as the second current to the temperature control unit, when the temperature detected by the temperature detecting unit rises above the predetermined temperature range suitable for charging the battery cell, and
stops the second current to the temperature control unit, when the temperature detected by the temperature detecting unit reaches the predetermined temperature range.

6. A battery device according to claim 1, wherein the current control unit selects a first charging operation mode to allow an operation of the current control unit, or a second charging operation to supply the entire externally-supplied charging current to the battery cell regardless of a temperature detection result of the temperature detecting unit.

7. A battery device according to claim 1, further comprising a discharge control unit that divides a discharge current of the battery cell into a first discharge current supplied to an external device via the battery-side positive electrode terminal and the battery-side negative electrode terminal and a second discharge current supplied to the temperature control unit.

8. A battery device according to claim 1, wherein the battery cell is a lithium ion battery, a nickel nitrogen battery, or a nickel cadmium battery.

9. A battery device according to claim 2 or 3, wherein the heat generating element is a heater.

10. A battery device according to claim 4 or 5, wherein the heat absorbing element is a Peltier element.

11. A method for charging a battery cell including a secondary cell and housed in a casing including a battery-side positive and negative electrodes connected to the battery cell, comprising:
   detecting a temperature of the battery cell;
   heating the battery cell when the temperature falls below a predetermined temperature range, when an electric current is supplied to a temperature control unit;
   cooling the battery cell when the battery cell when the temperature rises above a predetermined temperature range, when the electric current is supplied to the temperature control unit; and
   dividing, by a processor and according to the temperature, an externally-supplied charging current supplied from an external source to the battery-side positive electrode terminal and the battery-side negative electrode terminal into a first current that supplies the battery cell and a second current that supplies the temperature control unit.

12. The battery charging method according to claim 11, further comprising:
   stopping the first electric current to the battery cell and supplying the second current to the temperature control unit, when the temperature falls below the predetermined temperature range suitable for charging the battery cell, and
   stopping the second current to the temperature control unit, when the temperature reaches the predetermined temperature range.

13. The battery charging method according to claim 11, further comprising:
   supplying a predetermined current for charging the battery cell without deteriorating the battery cell as the first current, and supplying a remaining current equal to the externally-supplied charging current minus the predetermined charging current as the second current, when the temperature falls below the predetermined temperature range suitable for charging the battery cell, and
   stopping the second current to the temperature control unit, when the temperature reaches the predetermined temperature range.

14. The battery charging method according to claim 11, further comprising:
   stopping the first current to the battery cell and supplying the second current to the temperature control unit, when the temperature rises above the predetermined temperature range suitable for charging the battery cell, and
   supplying the first current to the battery cell and stopping the second current to the temperature control unit, when the temperature reaches the predetermined temperature range.

15. The battery charging method according to claim 11, further comprising:
   supplying a predetermined current for charging the battery cell without deteriorating the battery cell as the first current, and supplying a remaining current equal to the externally-supplied charging current minus the predetermined charging current as the second current, when the temperature rises above the predetermined temperature range suitable for charging the battery cell, and
   stopping the second current to the temperature control unit, when the temperature reaches the predetermined temperature range.

16. The battery charging method according to claim 11, further comprising selecting a first charging operation mode to allow an operation of the current control unit, or selecting a second charging operation mode to supply the entire externally-supplied charging current to the battery cell regardless of the temperature.

17. The battery charging method according to claim 11, further comprising dividing a discharge current of the battery cell into a first discharge current supplied to an external device via the battery-side positive electrode terminal and the battery-side negative electrode terminal and a second discharge current supplied to the temperature control unit.

18. A battery apparatus including a secondary cell comprising:
   means for housing a battery cell;
   temperature detecting means for detecting a temperature of the battery cell;
   temperature control means for heating the battery cell when the temperature falls below a predetermined temperature range, and cooling the battery cell when the battery cell when the temperature rises above a predetermined temperature range, when an electric current is supplied thereto; and
   current control means for dividing, according to the temperature detected by the temperature detecting means, an externally-supplied charging current supplied from an external source to the battery-side positive electrode terminal and the battery-side negative electrode terminal into a first current that supplies the battery cell and a second current that supplies the temperature control means.

19. The battery apparatus according to claim 18, further comprising a discharge control means for dividing a discharge current of the battery cell into a first discharge current supplied to an external device via the battery-side positive electrode terminal and the battery-side negative electrode terminal, and a second discharge current supplied to the temperature control means.

* * * * *